(12) United States Patent  
Moraleda

(10) Patent No.: US 8,176,054 B2  
(45) Date of Patent: May 8, 2012

(54) RETRIEVING ELECTRONIC DOCUMENTS BY CONVERTING THEM TO SYNTHETIC TEXT

(75) Inventor: Jorge Moraleda, Menlo Park, CA (US)

(73) Assignee: Ricoh Co. Ltd, Tokyo (JP)

( * ) Notice: Subject to any disclaimer, the term of this patent is extended or adjusted under 35 U.S.C. 154(b) by 132 days.

(21) Appl. No.: 11/777,142

(22) Filed: Jul. 12, 2007

(65) Prior Publication Data

US 2009/0018990 A1    Jan. 15, 2009

(51) Int. Cl.
*G06F 7/00* (2006.01)

(52) U.S. Cl. ........ 707/743; 707/744; 707/793; 382/175; 382/243

(58) Field of Classification Search .................. None
See application file for complete search history.

(56) References Cited

U.S. PATENT DOCUMENTS

| | | |
|---|---|---|
| 1,915,993 A | 6/1933 | Handel |
| 4,759,075 A | 7/1988 | Lipkie et al. |
| 5,027,421 A | 6/1991 | Kanno |
| 5,035,302 A | 7/1991 | Thangavelu |
| 5,077,805 A | 12/1991 | Tan |
| 5,109,439 A | 4/1992 | Froessl |
| 5,263,100 A | 11/1993 | Kim et al. |
| 5,392,447 A | 2/1995 | Schlack et al. |
| 5,416,892 A | 5/1995 | Loken-Kim |
| 5,432,864 A | 7/1995 | Lu et al. |
| 5,465,353 A | 11/1995 | Hull et al. |
| 5,493,689 A | 2/1996 | Waclawsky et al. |
| 5,546,502 A | 8/1996 | Hart et al. |
| 5,553,217 A | 9/1996 | Hart et al. |
| 5,555,556 A | 9/1996 | Ozaki |

(Continued)

FOREIGN PATENT DOCUMENTS

CN    1245935    3/2000

(Continued)

OTHER PUBLICATIONS

Author: Michiel Hazewinkel; Title:Encyclopaedia of Mathematics; Date: 2001; Publisher: Springer; Pertinent pp. 1-3 (as attached in the pdf file).*

(Continued)

*Primary Examiner* — Tim T Vo
*Assistant Examiner* — Anh Tai Tran
(74) *Attorney, Agent, or Firm* — Patent Law Works LLP

(57) ABSTRACT

The present invention relies on the two-dimensional information in documents and encodes two-dimensional structures into a one-dimensional synthetic language such that two-dimensional documents can be searched at text search speed. The system comprises: an indexing module, a retrieval module, an encoder, a quantization module, a retrieval engine and a control module coupled by a bus. A number of electronic documents are first indexed by the indexing module and stored as a synthetic text library. The retrieval module then converts and input image to synthetic text and searches for matches to the synthetic text in the synthetic text library. The matches can be in turn used to retrieve the corresponding electronic documents. It should be noted that a plurality of matches and corresponding electronic documents may be retrieves ranked by order according the similarity of the synthetic text. In one or more embodiments, the present invention includes a method for indexing documents by converting them to synthetic text, and a method for retrieving documents by converting an image to synthetic text and comparing the synthetic text to documents that have been converted to synthetic text for a match.

19 Claims, 15 Drawing Sheets

U.S. PATENT DOCUMENTS

| | | | |
|---|---|---|---|
| 5,579,471 A | 11/1996 | Barber et al. | |
| 5,706,097 A | 1/1998 | Schelling et al. | |
| 5,752,055 A | 5/1998 | Redpath et al. | |
| 5,761,344 A | 6/1998 | Al-Hussein | |
| 5,764,277 A | 6/1998 | Loui et al. | |
| 5,806,005 A | 9/1998 | Hull et al. | |
| 5,832,474 A * | 11/1998 | Lopresti et al. | 707/2 |
| 5,832,530 A | 11/1998 | Paknad et al. | |
| 5,842,194 A | 11/1998 | Arbuckle | |
| 5,873,077 A | 2/1999 | Kanoh et al. | |
| 5,892,843 A | 4/1999 | Zhou et al. | |
| 5,899,999 A | 5/1999 | De Bonet | |
| 5,905,502 A * | 5/1999 | Deering | 345/420 |
| 5,918,012 A | 6/1999 | Astiz et al. | |
| 5,956,468 A | 9/1999 | Ancin | |
| 5,968,175 A | 10/1999 | Morishita et al. | |
| 5,999,915 A | 12/1999 | Nahan et al. | |
| 6,035,055 A * | 3/2000 | Wang et al. | 382/118 |
| 6,104,834 A | 8/2000 | Hull | |
| 6,121,969 A | 9/2000 | Jain et al. | |
| 6,138,129 A | 10/2000 | Combs | |
| 6,192,157 B1 | 2/2001 | Prebble | |
| 6,208,771 B1 | 3/2001 | Jared et al. | |
| 6,223,171 B1 | 4/2001 | Chaudhuri et al. | |
| 6,253,201 B1 | 6/2001 | Abdel-Mottaleb et al. | |
| 6,301,386 B1 | 10/2001 | Zhu et al. | |
| 6,332,039 B1 | 12/2001 | Bando et al. | |
| 6,345,274 B1 | 2/2002 | Zhu et al. | |
| 6,353,822 B1 | 3/2002 | Lieberman | |
| 6,363,381 B1 | 3/2002 | Lee et al. | |
| 6,393,142 B1 | 5/2002 | Swain et al. | |
| 6,397,213 B1 | 5/2002 | Cullen et al. | |
| 6,405,172 B1 | 6/2002 | Baker et al. | |
| 6,408,257 B1 | 6/2002 | Harrington et al. | |
| 6,411,953 B1 | 6/2002 | Ganapathy et al. | |
| 6,448,979 B1 | 9/2002 | Schena et al. | |
| 6,457,026 B1 | 9/2002 | Graham et al. | |
| 6,460,036 B1 | 10/2002 | Herz | |
| 6,470,264 B2 | 10/2002 | Bide | |
| 6,504,571 B1 | 1/2003 | Narayanaswami et al. | |
| 6,537,324 B1 | 3/2003 | Tabata et al. | |
| 6,567,799 B2 | 5/2003 | Sweet et al. | |
| 6,574,375 B1 | 6/2003 | Cullen et al. | |
| 6,574,644 B2 | 6/2003 | Hsu et al. | |
| 6,584,223 B1 | 6/2003 | Shiiyama | |
| 6,611,862 B2 | 8/2003 | Reisman | |
| 6,732,915 B1 | 5/2004 | Nelson et al. | |
| 6,751,343 B1 | 6/2004 | Ferrell et al. | |
| 6,753,883 B2 | 6/2004 | Schena et al. | |
| 6,766,363 B1 | 7/2004 | Rothschild | |
| 6,791,605 B1 | 9/2004 | Reele et al. | |
| 6,799,201 B1 | 9/2004 | Lee et al. | |
| 6,804,332 B1 | 10/2004 | Miner et al. | |
| 6,804,659 B1 | 10/2004 | Graham et al. | |
| 6,813,381 B2 | 11/2004 | Ohnishi et al. | |
| 6,824,057 B2 | 11/2004 | Rathus et al. | |
| 6,827,267 B2 | 12/2004 | Rathus et al. | |
| 6,830,187 B2 | 12/2004 | Rathus et al. | |
| 6,834,804 B2 | 12/2004 | Rathus et al. | |
| 6,842,755 B2 | 1/2005 | Maslov | |
| 6,843,411 B2 | 1/2005 | Rathus et al. | |
| 6,859,909 B1 | 2/2005 | Lerner et al. | |
| 6,865,302 B2 | 3/2005 | Chang | |
| 6,866,196 B1 | 3/2005 | Rathus et al. | |
| 6,922,699 B2 | 7/2005 | Schuetze et al. | |
| 6,929,182 B2 | 8/2005 | Rathus et al. | |
| 6,940,491 B2 | 9/2005 | Incertis Carro | |
| 6,963,358 B2 | 11/2005 | Cohen et al. | |
| 6,964,374 B1 | 11/2005 | Djuknic et al. | |
| 6,980,962 B1 | 12/2005 | Arganbright et al. | |
| 6,981,224 B1 | 12/2005 | Gardner et al. | |
| 6,993,573 B2 | 1/2006 | Hunter | |
| 7,013,309 B2 | 3/2006 | Chakraborty et al. | |
| 7,031,965 B1 | 4/2006 | Moriya et al. | |
| 7,051,086 B2 | 5/2006 | Rhoads et al. | |
| 7,089,487 B2 | 8/2006 | Tsai | |
| 7,092,953 B1 | 8/2006 | Haynes | |
| 7,134,095 B1 | 11/2006 | Smith et al. | |
| 7,150,399 B2 | 12/2006 | Barrus et al. | |
| 7,167,574 B2 * | 1/2007 | Kim | 382/100 |
| 7,174,031 B2 | 2/2007 | Rhoads et al. | |
| 7,185,274 B1 | 2/2007 | Rubin et al. | |
| 7,206,820 B1 | 4/2007 | Rhoads et al. | |
| 7,232,057 B2 | 6/2007 | Rathus et al. | |
| 7,236,632 B2 | 6/2007 | Erol et al. | |
| 7,240,279 B1 | 7/2007 | Chartier et al. | |
| 7,249,123 B2 | 7/2007 | Elder et al. | |
| 7,251,689 B2 | 7/2007 | Wesley | |
| 7,263,205 B2 | 8/2007 | Lev | |
| 7,305,435 B2 | 12/2007 | Hamynen | |
| 7,310,769 B1 | 12/2007 | Dash | |
| 7,310,779 B2 | 12/2007 | Carro | |
| 7,337,175 B2 | 2/2008 | Comps et al. | |
| 7,359,094 B1 | 4/2008 | Sayuda | |
| 7,363,580 B2 | 4/2008 | Tabata et al. | |
| 7,366,979 B2 | 4/2008 | Spielberg et al. | |
| 7,386,789 B2 | 6/2008 | Chao et al. | |
| 7,392,287 B2 | 6/2008 | Ratcliff, III | |
| 7,406,214 B2 | 7/2008 | Rhoads et al. | |
| 7,421,153 B1 | 9/2008 | Ronca et al. | |
| 7,421,155 B2 | 9/2008 | King et al. | |
| 7,437,023 B2 | 10/2008 | King et al. | |
| 7,450,760 B2 | 11/2008 | Molnar et al. | |
| 7,458,014 B1 | 11/2008 | Rubin et al. | |
| 7,489,415 B2 | 2/2009 | Furuta et al. | |
| 7,509,386 B2 | 3/2009 | Miyashita | |
| 7,546,524 B1 | 6/2009 | Bryar et al. | |
| 7,567,262 B1 | 7/2009 | Clemens et al. | |
| 7,593,605 B2 | 9/2009 | King et al. | |
| 7,593,961 B2 | 9/2009 | Eguchi et al. | |
| 7,613,686 B2 | 11/2009 | Rui | |
| 7,644,078 B2 | 1/2010 | Sastry et al. | |
| 7,653,238 B2 | 1/2010 | Stentiford | |
| 7,668,405 B2 | 2/2010 | Gallagher | |
| 7,680,850 B2 | 3/2010 | Oda | |
| 7,707,039 B2 | 4/2010 | King et al. | |
| 7,746,376 B2 | 6/2010 | Mendoza et al. | |
| 7,761,436 B2 | 7/2010 | Norton et al. | |
| 7,765,231 B2 | 7/2010 | Rathus et al. | |
| 7,812,986 B2 | 10/2010 | Graham et al. | |
| 7,872,669 B2 | 1/2011 | Darrell et al. | |
| 7,882,113 B2 | 2/2011 | Yaeger | |
| 7,930,292 B2 | 4/2011 | Nakajima | |
| 7,946,491 B2 | 5/2011 | Burian et al. | |
| 2001/0011276 A1 | 8/2001 | Durst Jr. et al. | |
| 2001/0013546 A1 | 8/2001 | Ross | |
| 2001/0024514 A1 | 9/2001 | Matsunaga | |
| 2001/0042030 A1 | 11/2001 | Ito et al. | |
| 2001/0042085 A1 | 11/2001 | Peairs et al. | |
| 2001/0043741 A1 | 11/2001 | Mahoney et al. | |
| 2001/0049700 A1 | 12/2001 | Ichikura | |
| 2002/0038430 A1 | 3/2002 | Edwards et al. | |
| 2002/0052872 A1 | 5/2002 | Yada | |
| 2002/0054059 A1 | 5/2002 | Schneiderman | |
| 2002/0063709 A1 | 5/2002 | Gilbert et al. | |
| 2002/0073236 A1 | 6/2002 | Helgeson et al. | |
| 2002/0102966 A1 | 8/2002 | Lev et al. | |
| 2002/0118379 A1 | 8/2002 | Chakraborty et al. | |
| 2002/0146176 A1 * | 10/2002 | Meyers | 382/218 |
| 2002/0154148 A1 | 10/2002 | Inoue et al. | |
| 2002/0157028 A1 | 10/2002 | Koue et al. | |
| 2002/0159640 A1 | 10/2002 | Vaithilingam et al. | |
| 2002/0191003 A1 | 12/2002 | Hobgood et al. | |
| 2002/0191848 A1 | 12/2002 | Boose et al. | |
| 2002/0194264 A1 | 12/2002 | Uchiyama et al. | |
| 2003/0025714 A1 | 2/2003 | Ebersole et al. | |
| 2003/0030835 A1 | 2/2003 | Yoshida et al. | |
| 2003/0098877 A1 | 5/2003 | Boegelund | |
| 2003/0110130 A1 | 6/2003 | Pelletier | |
| 2003/0110216 A1 | 6/2003 | Althin et al. | |
| 2003/0112930 A1 | 6/2003 | Bosik et al. | |
| 2003/0121006 A1 | 6/2003 | Tabata et al. | |
| 2003/0122922 A1 | 7/2003 | Saffer et al. | |
| 2003/0126147 A1 * | 7/2003 | Essafi et al. | 707/100 |
| 2003/0128375 A1 | 7/2003 | Ruhl et al. | |
| 2003/0151674 A1 | 8/2003 | Lin | |
| 2003/0152293 A1 | 8/2003 | Bresler et al. | |

| | | |
|---|---|---|
| 2003/0187886 A1 | 10/2003 | Hull et al. |
| 2003/0190094 A1 | 10/2003 | Yokota |
| 2003/0193530 A1 | 10/2003 | Blackman et al. |
| 2003/0212585 A1 | 11/2003 | Kyoya et al. |
| 2003/0229857 A1 | 12/2003 | Sayuda et al. |
| 2004/0017482 A1 | 1/2004 | Weitman |
| 2004/0027604 A1 | 2/2004 | Jeran et al. |
| 2004/0036679 A1 | 2/2004 | Emerson |
| 2004/0042667 A1* | 3/2004 | Lee et al. .................. 382/230 |
| 2004/0102898 A1 | 5/2004 | Yokota et al. |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0198396 A1 | 10/2004 | Fransioli |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0215689 A1 | 10/2004 | Dooley et al. |
| 2004/0221244 A1 | 11/2004 | Baldino |
| 2004/0233235 A1 | 11/2004 | Rubin et al. |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2005/0012960 A1 | 1/2005 | Eden et al. |
| 2005/0080693 A1 | 4/2005 | Foss et al. |
| 2005/0086188 A1 | 4/2005 | Hillis et al. |
| 2005/0086224 A1 | 4/2005 | Franciosa et al. |
| 2005/0089246 A1 | 4/2005 | Luo |
| 2005/0100219 A1 | 5/2005 | Berkner et al. |
| 2005/0114325 A1 | 5/2005 | Liu et al. |
| 2005/0125390 A1 | 6/2005 | Hurst-Hiller et al. |
| 2005/0129293 A1 | 6/2005 | Acharya et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1* | 7/2005 | Bargeron et al. .................. 707/3 |
| 2005/0165784 A1 | 7/2005 | Gomez et al. |
| 2005/0169520 A1 | 8/2005 | Chen et al. |
| 2005/0182773 A1 | 8/2005 | Feinsmith et al. |
| 2005/0185060 A1 | 8/2005 | Neven |
| 2005/0185225 A1 | 8/2005 | Brawn et al. |
| 2005/0190273 A1 | 9/2005 | Toyama et al. |
| 2005/0190972 A1 | 9/2005 | Thomas et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0240381 A1 | 10/2005 | Seiler et al. |
| 2005/0261990 A1 | 11/2005 | Gocht et al. |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk et al. |
| 2006/0012677 A1 | 1/2006 | Neven et al. |
| 2006/0020630 A1 | 1/2006 | Stager et al. |
| 2006/0023945 A1 | 2/2006 | King et al. |
| 2006/0026140 A1 | 2/2006 | King et al. |
| 2006/0041605 A1 | 2/2006 | King et al. |
| 2006/0043188 A1 | 3/2006 | Kricorissian |
| 2006/0048059 A1 | 3/2006 | Etkin |
| 2006/0053097 A1 | 3/2006 | King et al. |
| 2006/0056696 A1 | 3/2006 | Jun et al. |
| 2006/0056697 A1 | 3/2006 | Jun et al. |
| 2006/0061806 A1 | 3/2006 | King et al. |
| 2006/0070120 A1 | 3/2006 | Aoki et al. |
| 2006/0074828 A1 | 4/2006 | Heumann et al. |
| 2006/0082438 A1 | 4/2006 | Bazakos et al. |
| 2006/0085477 A1 | 4/2006 | Phillips et al. |
| 2006/0085735 A1 | 4/2006 | Shimizu |
| 2006/0104515 A1 | 5/2006 | King et al. |
| 2006/0112092 A1 | 5/2006 | Ziou et al. |
| 2006/0116555 A1 | 6/2006 | Pavlidis et al. |
| 2006/0119880 A1 | 6/2006 | Dandekar et al. |
| 2006/0122884 A1 | 6/2006 | Graham et al. |
| 2006/0122983 A1 | 6/2006 | King et al. |
| 2006/0123347 A1 | 6/2006 | Hewitt et al. |
| 2006/0140475 A1 | 6/2006 | Chin et al. |
| 2006/0140614 A1 | 6/2006 | Kim et al. |
| 2006/0143176 A1 | 6/2006 | Mojsilovic et al. |
| 2006/0150079 A1 | 7/2006 | Albornoz et al. |
| 2006/0190812 A1 | 8/2006 | Ellenby et al. |
| 2006/0200480 A1 | 9/2006 | Harris et al. |
| 2006/0206335 A1 | 9/2006 | Thelen et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1* | 11/2006 | Gokturk et al. ............. 382/305 |
| 2006/0253439 A1* | 11/2006 | Ren et al. ..................... 707/5 |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2007/0003166 A1 | 1/2007 | Berkner |
| 2007/0019261 A1 | 1/2007 | Chu |
| 2007/0036469 A1 | 2/2007 | Kim et al. |
| 2007/0041668 A1 | 2/2007 | Todaka |
| 2007/0047819 A1 | 3/2007 | Hull et al. |
| 2007/0053513 A1 | 3/2007 | Hoffberg |
| 2007/0076922 A1 | 4/2007 | Living et al. |
| 2007/0115373 A1 | 5/2007 | Gallagher et al. |
| 2007/0150466 A1 | 6/2007 | Brave et al. |
| 2007/0165904 A1 | 7/2007 | Nudd et al. |
| 2007/0174269 A1 | 7/2007 | Jing et al. |
| 2007/0175998 A1 | 8/2007 | Lev |
| 2007/0233613 A1 | 10/2007 | Barrus et al. |
| 2007/0271247 A1 | 11/2007 | Best et al. |
| 2007/0276845 A1 | 11/2007 | Geilich |
| 2008/0010605 A1 | 1/2008 | Frank |
| 2008/0071767 A1 | 3/2008 | Grieselhuber et al. |
| 2008/0078836 A1 | 4/2008 | Tomita |
| 2008/0267504 A1 | 10/2008 | Schloter et al. |
| 2008/0275881 A1 | 11/2008 | Conn et al. |
| 2008/0288476 A1 | 11/2008 | Kim et al. |
| 2008/0296362 A1 | 12/2008 | Lubow |
| 2008/0310717 A1* | 12/2008 | Saathoff et al. ............... 382/173 |
| 2009/0067726 A1 | 3/2009 | Erol et al. |
| 2009/0152357 A1 | 6/2009 | Lei et al. |
| 2009/0235187 A1 | 9/2009 | Kim et al. |
| 2010/0013615 A1 | 1/2010 | Hebert et al. |
| 2010/0174783 A1 | 7/2010 | Zarom |
| 2011/0121069 A1 | 5/2011 | Lindahl et al. |

FOREIGN PATENT DOCUMENTS

| | | |
|---|---|---|
| EP | 0706283 A | 4/1996 |
| EP | 1229496 A2 | 8/2002 |
| EP | 1555626 A2 | 7/2005 |
| EP | 1662064 A1 | 5/2006 |
| EP | 1783681 | 5/2007 |
| JP | 10-228468 A | 8/1998 |
| JP | 2000-165645 A | 6/2000 |
| JP | 200268179 | 9/2000 |
| JP | 2001211359 | 8/2001 |
| JP | 2001230916 | 8/2001 |
| JP | 2002513480 | 5/2002 |
| JP | 2005286395 | 10/2005 |
| JP | 2006053568 | 2/2006 |
| JP | 2006059351 | 3/2006 |
| JP | 2006215756 | 8/2006 |
| WO | WO 99/05658 A1 | 2/1999 |
| WO | WO 2004/072897 A2 | 8/2004 |
| WO | WO 2005/043270 A2 | 5/2005 |
| WO | WO 2007/073347 A1 | 6/2007 |
| WO | 2008129373 | 10/2008 |

OTHER PUBLICATIONS

Sivic, J. et al., "Video Google: A Text Retrieval Approach to Object Matching in Videos," Proceedings of the Ninth IEEE International Conference on Computer Vision (ICCV 2003), 2-volume Set, 2003, IEEE, pp. 1-8.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Erol, B. et al., "Linking Presentation Documents Using Image Analysis," IEEE, Nov. 9-12, 2003, pp. 97-101, vol. 1.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

U.S. Appl. No. 10/813,901, filed Mar. 30, 2004, Erol et al.

Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.

Akenine-Moller, T. et al., "Real-Time Rendering," A.K. Peters, Natick, MA, 2nd Edition, 2002, pp. 70-84.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.

Baird, H.S., "Document Image Defect Models and Their Uses," Proc., IAPR 2nd International Conference on Document Analysis and Recognition, Tsukuba Science City, Japan, Oct. 20-22, 1993, 7 pages.

Baird, H., "Document Image Defect Models," in Proc. of IAPR Workshop on Syntactic and Structural Pattern Recognition, Murray Hill, NJ, Jun. 1990, Structured Document Image Analysis, Springer-Verlag, pp. 546-556.

Baird, H., "The State of the Art of Document Image Degradation Modeling," in Proc. of the 4th IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.

Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.

Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.

Brassil, J. et al., "Hiding Information in Document Images," Proc. Conf. Information Sciences and Systems (CISS-95), Mar. 1995, Johns Hopkins University, Baltimore, MD, pp. 482-489.

"Call for Papers: ICAT 2007," 17th International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.

Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.

Cover, T.M. et al., "Nearest Neighbor Pattern Classification," IEEE Transactions on Information Theory, Jan. 1967, pp. 21-27, vol. IT-13, No. 1.

Davis, M. et al., "Towards Context-Aware Face Recognition," Proceedings of the 13th Annual ACM International Conference on Multimedia, Nov. 6-11, 2005, pp. 483-486, vol. 13.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.

Erol, B. et al., "Linking Multimedia Presentations with Their Symbolic Source Documents: Algorithm and Applications," Nov. 2-8, 2003, pp. 498-507, [Online] [Retreived on Oct. 15, 2008] Retrieved from the Internet<URL:http://rii.ricoh.com/{hull/pubs/p225_erol.pdf>.

Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

Ho, T.K. et al., "Decision Combination in Multiple Classifier Systems," IEEE Transactions on Pattern Analysis and Machine Intelligence, Jan. 1994, pp. 66-75, vol. 16, No. 1.

Ho, T.K. et al., "Evaluation of OCT Accuracy Using Synthetic Data," Proceedings of the 4th Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoch.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," 17th International Conference on Artificial Reality and Telexistence, Nov. 1, 2007, pp. 205-209.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Funct on Word Ident ficat on n Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usdandrewt/papers/Validate/journal.ps.gz>.

Liang, J. et al., "Flattening Curved Documents in Images," in Proc. of the IEEE Conf. on Computer Vision and Pattern Recognition (CVPR), 2005, 8 pages, [online] Retrieved from the Internet<URL: http://www.cfar.umd.edu/~daniel/daniel_papersfordownload/liang-j_cpvr2005.pdf>.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL: http://www.pcworld.com/news/article/0,aid,11016,00.asp>.

Microsoft Computer Dictionary (5$^{th}$ ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL: http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," in Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL: http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia,"Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zhang, Z., "A Flexible New Technique for Camera Calibration," IEEE Transactions on Pattern Analysis and Machine Intelligence, Nov. 2000, pp. 1330-1334, vol. 22, No. 11.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>=.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL: http://web.archive.org/web/20060619172549/http://www.scanbuy.com/website/solutions_su...>.

Canny, J., "A Computational Approach to Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm," International Conference on Image Analysis and Processing, 1999, pp. 322-327.

Duda, R. O. et al., "Use of the Hough Transformation to Detect Lines and Curves in Pictures," Communications of the ACM, Jan. 1972, pp. 11-15, vol. 15, No. 1.

Erol, B. et al., "Prescient Paper: Multimedia Document Creation with Document Image Matching," 17$^{th}$ International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards A System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7$^{th}$ International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6$^{th}$ British Machine Vision Conference, 1995, 10 pages.

Sezgin, M. et al., "Survey Over Image Thresholding Techniques and Quantitative Performance Evaluation," Journal of Electronic Imaging, Jan. 2004, pp. 146-165, vol. 13, No. 1.

Triantafyllidis, G.A. et al., "Detection of Blocking Artifacts of Compressed Still Images," Proceedings of the 11$^{th}$ International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Zanibbi, R. et al. "A Survey of Table Recognition," International Journal on Document Analysis and Recognition, 2004, pp. 1-33.

Zhao, W. et al., Face Recognition: A Literature Survey, ACM Computing Surveys (CSUR), 2003, pp. 399-458, vol. 35, No. 4.

European Search Report, European Application No. 09156089.6, Jun. 19, 2009, 8 pages.

Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.

European Search Report, European Application No. 09170045.0, Nov. 24, 2009, 4 pages.

Roth, M.T. et al., "The Garlic Project," Proc. of the 1996 ACM SIGMOD International Conference on Management of Data, Montreal, Quebec, Canada, Jun. 4, 1996, pp. 557.

United States Office Action, U.S. Appl. No. 11/624,466, Jun. 8, 2010, 29 pages.

United States Office Action, U.S. Appl. No. 11/827,530, Jun. 9, 2010, 35 pages.

United States Office Action, U.S. Appl. No. 11/461,294, Jun. 11, 2010, 19 pages.

United States Office Action, U.S. Appl. No. 11/461,300, Jun. 11, 2010, 20 pages.

United States Office Action, U.S. Appl. No. 11/461,024, Jul. 14, 2010, 29 pages.

United States Office Action, U.S. Appl. No. 11/461,049, Jul. 28, 2010, 27 pages.

United States Office Action, U.S. Appl. No. 11/461,279, Aug. 5, 2010, 37 pages.

United States Office Action, U.S. Appl. No. 11/461,286, Aug. 5, 2010, 28 pages.

United States Office Action, U.S. Appl. No. 12/240,596, Aug. 6, 2010, 32 pages.

Liu, Y. et al., "Automatic Texture Segmentation for Texture-Based Image Retrieval," IEEE, Jan. 5-7, 2004, pp. 285-288.

Liu, T. et al., "A Fast Image Segmentation Algorithm for Interactive Video Hotspot Retrieval," IEEE, 2001, pp. 3-8.

Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.

Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.

U.S. Office Action, U.S. Appl. No. 11/776,520, Dec. 7, 2010, 43 pages.

U.S. Office Action, U.S. Appl. No. 12/719,437, Dec. 9, 2010, 38 pages.

U.S. Office Action, U.S. Appl. No. 11/776,510, Dec. 10, 2010, 39 pages.

U.S. Office Action, U.S. Appl. No. 11/461,126, Dec. 23, 2010, 30 pages.

U.S. Office Action, U.S. Appl. No. 11/461,279, Jan. 7, 2011, 44 pages.

U.S. Office Action, U.S. Appl. No. 12/240,596, Jan. 21, 2011, 21 pages.

U.S. Office Action, U.S. Appl. No. 11/461,286, Jan. 21, 2011, 34 pages.

U.S. Office Action, U.S. Appl. No. 11/461,143, Feb. 4, 2011, 16 pages.

Japanese Office Action, Japanese Application No. 2004-293962, Aug. 24, 2010, 3 pages.

Extended European Search Report, Application No. 09178280.5-2201/2202646, Aug. 31, 2010, 6 pages.

United States Office Action, U.S. Appl. No. 11/461,143, Aug. 18, 2010, 9 pages.

United States Office Action, U.S. Appl. No. 11/461,272, Aug. 23, 2010, 31 pages.

United States Office Action, U.S. Appl. No. 11/461,126, Sep. 3, 2010, 28 pages.

United States Notice of Allowance, U.S. Appl. No. 11/461,095, Sep. 27, 2010, 29 pages.

United States Office Action, U.S. Appl. No. 12/060,194, Oct. 1, 2010, 29 pages.

United States Office Action, U.S. Appl. No. 11/461,294, Oct. 7, 2010, 17 pages.

United States Office Action, U.S. Appl. No. 11/461,300, Oct. 6, 2010, 20 pages.

United States Office Action, U.S. Appl. No. 11/827,530, Oct. 7, 2010, 21 pages.

United States Office Action, U.S. Appl. No. 11/624,466, Oct. 14, 2010, 11 pages.

United States Notice of Allowance, U.S. Appl. No. 11/461,091, Oct. 18, 2010, 31 pages.

United States Notice of Allowance, U.S. Appl. No. 11/461,024, Nov. 15, 2010, 10 pages.

United States Notice of Allowance, U.S. Appl. No. 11/461,049, Nov. 16, 2010, 10 pages.

United States Notice of Allowability, U.S. Appl. No. 11/461,091, Nov. 17, 2010, 22 pages.

Japanese Office Action, Japanese Patent Application No. 200910138044.X, Jan. 26, 2011, 6 pages.

U.S. Notice of Allowance, U.S. Appl. No. 11/624,466, Feb. 22, 2011, 12 pages.

U.S. Notice of Allowance, U.S. Appl. No. 11/461,272, Feb. 23, 2011, 28 pages.

U.S. Office Action, U.S. Appl. No. 12/060,194, Feb. 25, 2011, 18 pages.

U.S. Office Action, U.S. Appl. No. 12/879,933, Mar. 2, 2011, 7 pages.

U.S. Office Action, U.S. Appl. No. 12/210,519, Mar. 14, 2011, 38 pages.

U.S. Notice of Allowance, U.S. Appl. No. 11/461,024, Mar. 16, 2011, 12 pages.

U.S. Office Action, U.S. Appl. No. 11/461,300, Mar. 18, 2011, 25 pages.

U.S. Office Action, U.S. Appl. No. 11/461,037, Mar. 30, 2011, 29 pages.

U.S. Office Action, U.S. Appl. No. 12/210,511, Apr. 4, 2011, 49 pages.

U.S. Office Action, U.S. Appl. No. 12/247,202, Apr. 6, 2011, 37 pages.

U.S. Office Action, U.S. Appl. No. 11/461,126, Apr. 12, 2011, 27 pages.

U.S. Office Action, U.S. Appl. No. 11/461,294, Apr. 12, 2011, 23 pages.

U.S. Office Action, U.S. Appl. No. 12/210,540, Apr. 15, 2011, 45 pages.

U.S. Office Action, U.S. Appl. No. 12/340,124, Apr. 15, 2011, 48 pages.

Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.

Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.

Rademacher, "View-Dependent Geometry", Computer Graphics Proceedings, Annual Conference Series, Siggraph 99, Los Angeles, California Aug. 8-13, 1999, pp. 439-446, XP001024743.

U.S. Patent Office Action, U.S. Appl. No. 12/121,275, Apr. 20, 2011, 44 pages.

U.S. Patent Office Action, U.S. Appl. No. 11/776,520, Apr. 28, 2011, 10 pages.

Extended European Search Report, European Patent Application No. 082523770, May 2, 2011, 6 pages.

U.S. Patent Office Action, U.S. Appl. No. 11/776,510, May 12, 2011, 20 pages.

U.S. Patent Office Action, U.S. Appl. No. 12/210,519, Jun. 16, 2011, 22 pages.

U.S. Patent Office Action, U.S. Appl. No. 12/060,194, Jun. 27, 2011, 18 pages.

Adobe Acrobat Advanced Elements (for both PC and Mac Computers), 2002, pp. 1-19.
U.S. Office Action, U.S. Appl. No. 12/210,540, Oct. 14, 2011, 22 pages.
U.S. Office Action, U.S. Appl. No. 12/265,502, Oct. 14, 2011, 61 pages.
U.S. Office Action, U.S. Appl. No. 11/776,520, Oct. 17, 2011, 19 pages.
U.S. Office Action, U.S. Appl. No. 12/121,275, Oct. 19, 2011, 24 pages.
U.S. Office Action, U.S. Appl. No. 12/340,124, Oct. 24, 2011, 31 pages.
U.S. Office Action, U.S. Appl. No. 11/827,530, Oct. 28, 2011, 43 pages.
U.S. Office Action, U.S. Appl. No. 12/879,933, Oct. 28, 2011, 36 pages.
U.S. Office Action, U.S. Appl. No. 12/210,532, Oct. 31, 2011, 61 pages.
U.S. Office Action, U.S. Appl. No. 11/461,037, Nov. 23, 2011, 33 pages.
U.S. Notice of Allowance, U.S. Appl. No. 12/060,194, Nov. 28, 2011, 23 pages.
U.S. Office Action, U.S. Appl. No. 11/461,126, Dec. 1, 2011, 53 pages.
U.S. Notice of Allowance, U.S. Appl. No. 11/461,143, Dec. 5, 2011, 15 pages.
United States Office Action, U.S. Appl. No. 11/461,279, Jul. 8, 2011, 46 pages.
United States Office Action, U.S. Appl. No. 11/461,286, Jul. 15, 2011, 37 pages.
United States Office Action, U.S. Appl. No. 11/461,126, Jul. 22, 2011, 35 pages.
United States Notice of Allowance, U.S. Appl. No. 12/247,202, Jul. 28, 2011, 16 pages.
United States Office Action, U.S. Appl. No. 11/461,143, Aug. 11, 2011, 20 pages.
United States Office Action, U.S. Appl. No. 11/776,530, Aug. 19, 2011, 54 pages.
United States Office Action, U.S. Appl. No. 12/253,715, Aug. 31, 2011, 58 pages.
United States Office Action, U.S. Appl. No. 12/060,198, Sep. 1, 2011, 87 pages.
United States Office Action, U.S. Appl. No. 12/060,200, Sep. 2, 2011, 65 pages.
United States Notice of Allowance, U.S. Appl. No. 11/776,510, Sep. 22, 2011, 11 pages.
United States Office Action, U.S. Appl. No. 12/210,511, Sep. 28, 2011, 25 pages.
United States Office Action, U.S. Appl. No. 12/247,205, Oct. 6, 2011, 56 pages.
United States Office Action, U.S. Appl. No. 12/342,330, Oct. 7, 2011, 47 pages.
Mae et al., "Object Recognition Using Appearance Models Accumulated into Environment", Proc. 15-th Intl. Conf. on Pattern Recognition, 2000, vol. 4, pp. 845-848.
EPO Summons for Oral Proceedings, European Patent Application No. 07015093.3, Sep. 16, 2011, 4 pages.
Japanese Office Action, Japanese Patent Application No. 2008-008112, Oct. 25, 2011, 3 pages.
United States Office Action, U.S. Appl. No. 12/060,206, Dec. 15, 2011, 55 pages.
United States Notice of Allowance, U.S. Appl. No. 11/776,530, Dec. 21, 2011, 17 pages.
United States Office Action, U.S. Appl. No. 12/210,519, Jan. 5, 2012, 29 pages.
United States Notice of Allowance, U.S. Appl. No. 11/776,520, Jan. 5, 2012, 28 pages.
United States Office Action, U.S. Appl. No. 11/461,294, Jan. 18, 2012, 38 pages.
United States Office Action, U.S. Appl. No. 11/461,286, Jan. 20, 2012, 27 pages.
United States Notice of Allowance, U.S. Appl. No. 12/342,330, Jan. 23, 2012, 21 pages.
United States Office Action, U.S. Appl. No. 12/059,583, Jan. 26, 2012, 78 pages.
United States Notice of Allowance, U.S. Appl. No. 12/253,815, Jan. 26, 2012, 62 pages.
United States Office Action, U.S. Appl. No. 12/240,596, Feb. 2, 2012, 44 pages.
United States Office Action, U.S. Appl. No. 11/461,300, Feb. 23, 2012, 38 pages.

* cited by examiner

RETRIEVING ELECTRONIC DOCUMENTS BY CONVERTING THEM TO SYNTHETIC TEXT

BACKGROUND OF THE INVENTION

1. Field of the Invention

This invention relates generally to systems and methods for retrieving electronic documents using an image or portion of the electronic document. More particularly, the present invention is related to systems and methods for retrieving electronic documents by converting the electronic documents to synthetic text, converting an input image to synthetic text, and comparing the synthetic text for a match.

2. Description of the Related Art

The retrieval of electronic documents in the presence of noise or only given a very small part of the document is a very difficult problem. The larger the collection of documents, the more difficult the problem is. For example, retrieving an electronic text document given a blurry or illegible image of a portion of a printed page taken with a camera cell phone is difficult when the corpus of is large. This problem 100 is illustrated by FIG. 1A that shows an example image input 102 and a corresponding original electronic document 104. Furthermore, identifying the location 106 in the document 104 and the corresponding text 106 is even more difficult. This problem is only increased with the proliferation of low quality cameras and image capture devices and the ease in which they can be used to send the images.

One attempt by the prior art to solve this problem is to extract features of the image and use an index to retrieve documents containing a majority of the features. For example, inverted files are used to index individual image features. However, the features do not provide enough context information for consistent and accurate matches. Moreover, because of the poor quality of the input image it is often difficult to identify the features in the input image. Even when features can be identified in the input image, the noise degrades the information such that it is often not sufficient to find a matching electronic document. In other words, the features are incorrectly recognized leading matches to the wrong documents.

Another approach is to apply Optical Character Recognition (OCR) on the input image and the use the output of the OCR process to search the text strings of in the document. However, this suffers from the same problems noted above, namely that the image quality is so poor that OCR cannot be effectively performed. Even when it is performed, the error rate in the recognition is so high as to make the search ineffective because the matching documents are so unrelated to the original image.

SUMMARY OF THE INVENTION

The present invention overcomes the deficiencies of the prior art with a system for retrieving electronic documents by converting them to synthetic text. The present invention is particularly advantageous because it is able to match images that include a high level of noise even from a small portion of the original document to an electronic version of the document from which it was created. In other words, the present invention provides a system that extracts images features that can be reliably recognized on blurry images and yet sufficiently discriminate to differentiate between documents. The present invention also provides a computationally efficient indexing mechanism that searches for matching documents that is unaffected by features that have noise and relies on feature location in the sample image and the document.

The system of the present invention converts electronic documents to plain text documents in a synthetic language to be able to leverage existing text document retrieval algorithms that are very fast and scalable, thus enabling search of arbitrary electronic documents at text search speeds. The present invention advantageously provides full true mapping of the electronic document to plain text where the plain text is in a synthetic language and where the synthetic text representation of the document alone is sufficient to perform retrieval. More specifically, the synthetic text does not represent the natural language content of the original document if any, in contrast to OCR. The present invention relies on the two-dimensional information in documents and encodes two-dimensional structures into a one-dimensional synthetic language such that two-dimensional documents can be searched at text search speed. In one embodiment, the system comprises: an indexing module, a retrieval module, an encoder, a quantization module, a retrieval engine and a control module coupled by a bus. A number of electronic documents are first indexed by the indexing module and stored as a synthetic text library. The retrieval module then converts an input image to synthetic text and searches for matches to the synthetic text in the synthetic text library. The matches can be in turn used to retrieve the corresponding electronic documents. It should be noted that a plurality of matches and corresponding electronic documents may be retrieved ranked by order according the similarity of the synthetic text.

In one or more embodiments, the present invention includes a method for indexing documents by converting them to synthetic text, and a method for retrieving documents by converting an image to synthetic text and comparing the synthetic text to documents that have been converted to synthetic text for a match.

The features and advantages described herein are not all-inclusive, and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIGS. 12A and 12B illustrate the results of encoding and image patch and a base document with the overlapping matching synthetics text shown with highlighting.

DETAILED DESCRIPTION OF PREFERRED EMBODIMENTS

Figure 1A:
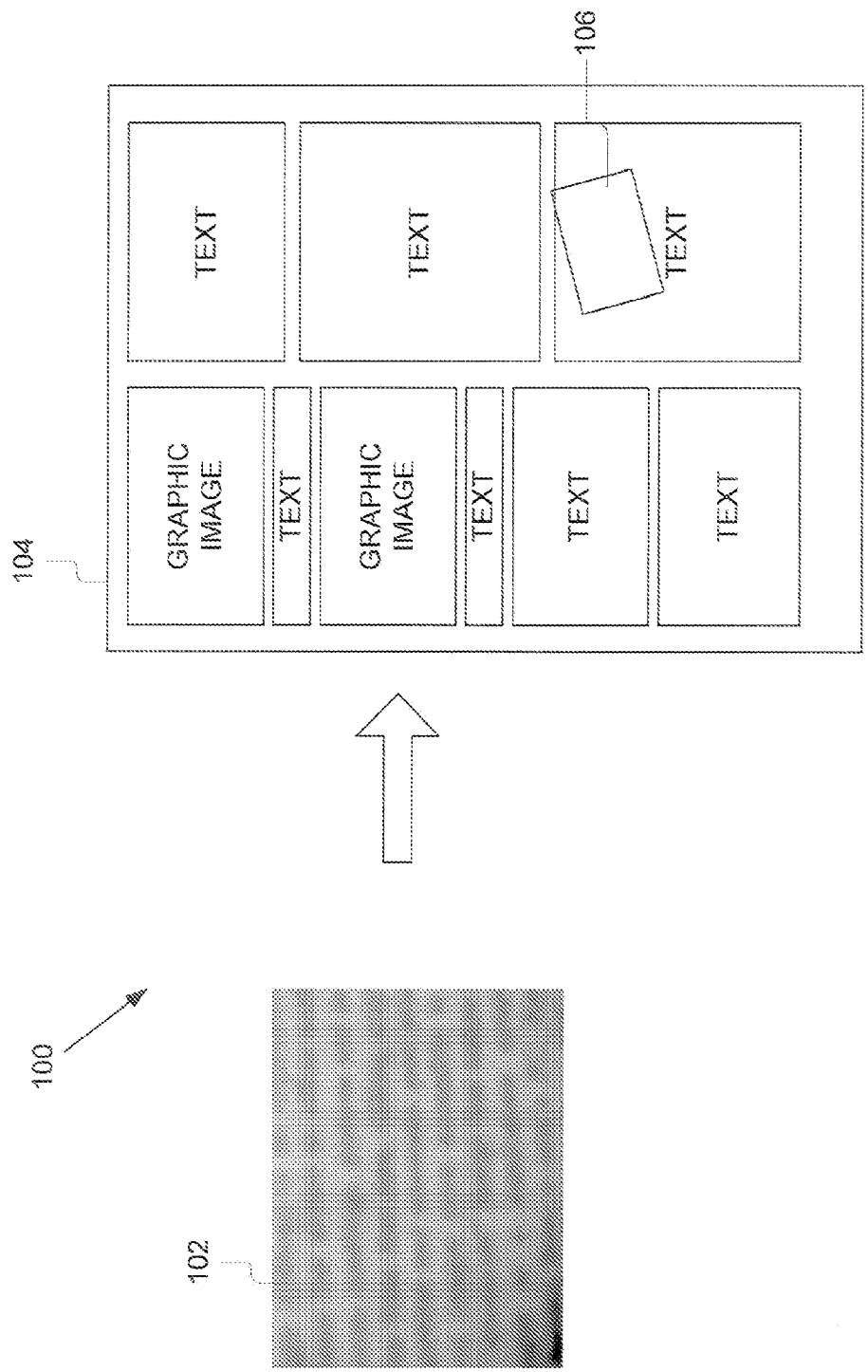
FIG. 1A illustrates a high level diagram of the problem solved by the present invention.

A system and methods for converting electronic documents to synthetic text, and using the synthetic text for retrieving electronic documents are described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment," "an embodiment" or "the embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, a personal digital assistant (PDA), a cellular telephone or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System

Figure 1B:
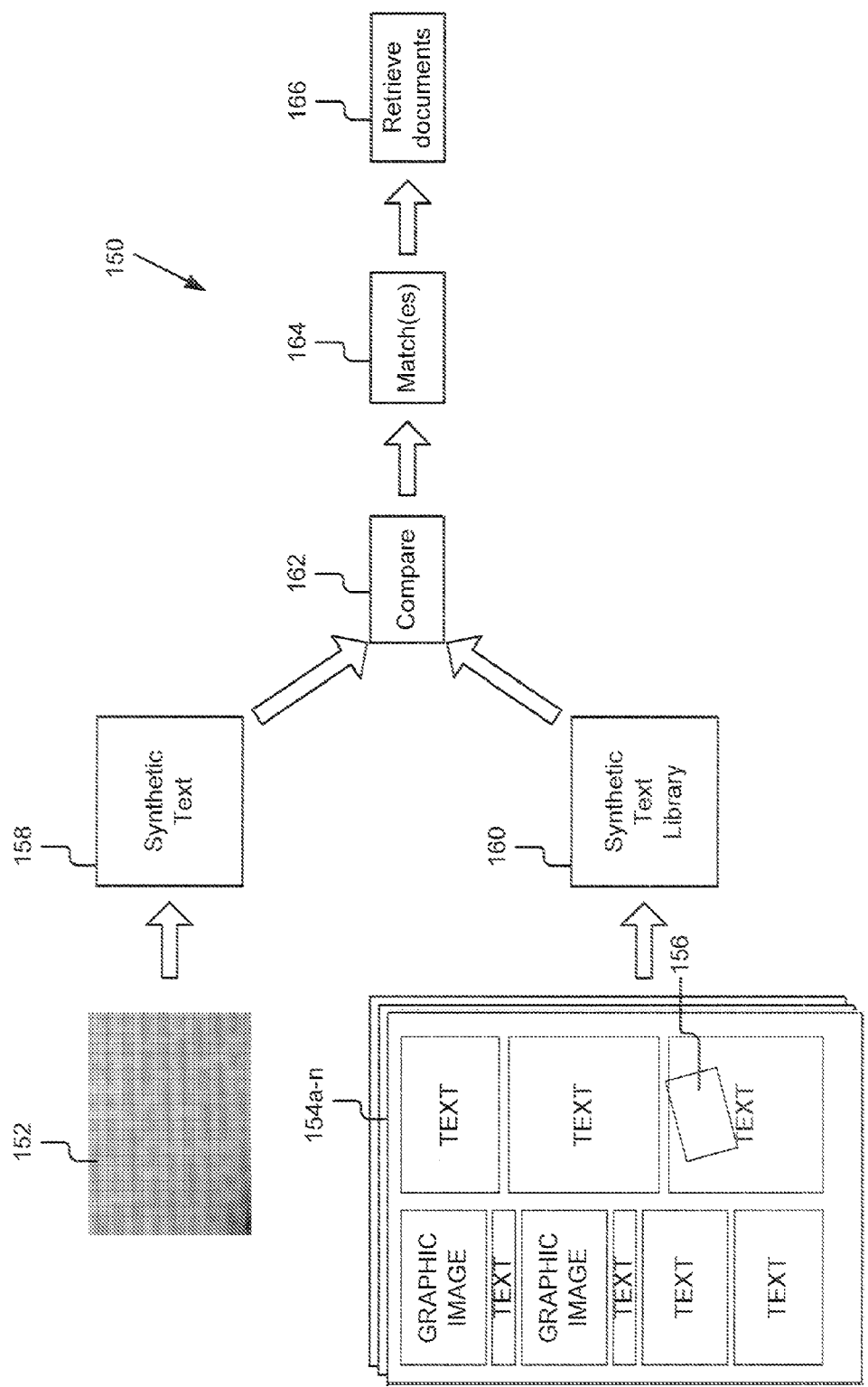
FIG. 1B illustrates a functional diagram of an embodiment of the present invention.

FIG. 1B shows a functional diagram of an embodiment of the system 150 of the present invention. The present invention advantageously identifies an original electronic document based on a very small portion and/or noisy image 152 of the document. The system 150 receives an image 152, for example of a small portion of a document from a camera such as in a cell phone (not shown). The system 150 converts the image 152 to a synthetic text representation 158, as will be described in more detail below. Preferably some time previously, the system 150 also received a plurality of electronic documents 154a-n; processed the documents to generate corresponding synthetic text; and indexed them to produce a library 160 of synthetic text documents. Then the system 105 compares the synthetic text 158 to the synthetic text library 160. In one embodiment, the comparison is performed by searching for the synthetic text 158 string in the corpus of document in the synthetic text library 106. This is particularly advantageous because any number of existing text search engines may be used for the comparison. Thus, the full power of existing text retrieval engines can be used. The matching documents 164 and locations are identified, and the index is used to retrieve the original documents 166. Then they can be presented or displayed to the user.

Figure 2:
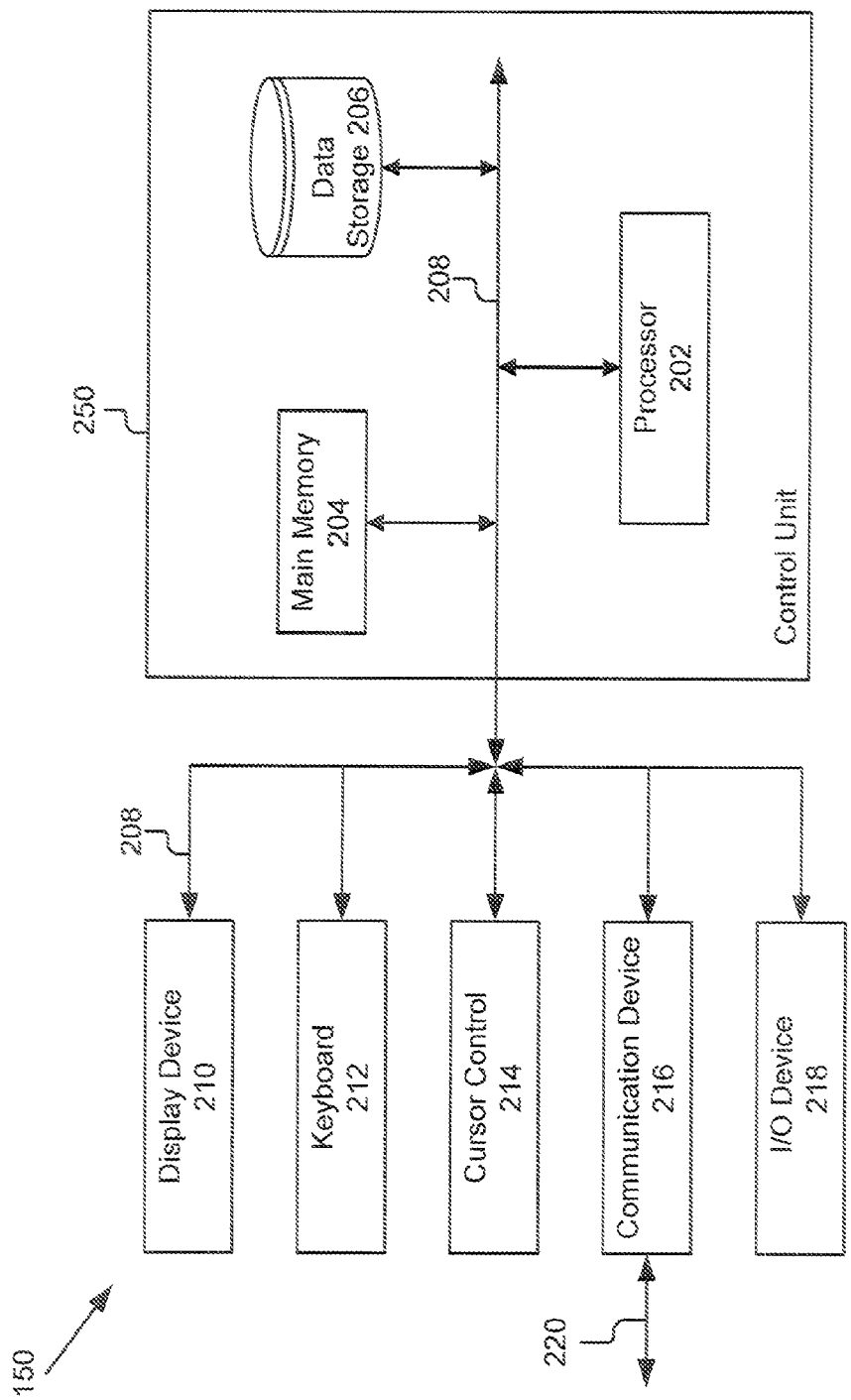
FIG. 2 illustrates a block diagram for system for performing indexing and retrieval of documents in accordance with the present invention.

Referring now also to FIG. 2, a functional block diagram of the system 150 configured in accordance with embodiments of the present invention is shown. The system 150 preferably comprises a control unit 250, the display device 210, a keyboard 212 and cursor control 214. The system 150 may optionally include a communication device 216 and one or more input/output (I/O) devices 218.

The control unit 250 comprises an arithmetic logic unit, a microprocessor, a general purpose computer or some other information appliance equipped to provide electronic display signals to display device 210. In one embodiment, the control unit 250 comprises a general purpose computer having a graphical user interface, which may be generated by, for example, a program written in Java running on top of an operating system like WINDOWS® or UNIX®.

Still referring to FIG. 2, the control unit 250 is shown including processor 202, main memory 204 and data storage device 206, all of which are communicatively coupled to a system bus 208.

Processor 202 processes data signals and may comprise various computing architectures including a complex instruction set computer (CISC) architecture, a reduced instruction set computer (RISC) architecture, or an architecture implementing a one or more of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIG. 3.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the data storage device 206 includes data for presentation on the display device 210. In another embodiment, the data storage device 206 is a disk array separate from the system 150 but communicatively coupled for high speed access.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the keyboard 212, the cursor control 214, the communication device 216 and the I/O device(s) 218.

The display device 210 represents any device equipped to display electronic images and data as described herein. In one embodiment, the display device 210 is a liquid crystal display (LCD) and light emitting diodes (LEDs) similar to those on many conventional display system for computers to provide a display area and status feedback, operation settings and other information to the user. In other embodiments, the display device 210 may be cathode ray tube type display.

Keyboard 212 represents an alphanumeric input device coupled to control unit 250 to communicate information and command selections to processor 202. The keyboard 212 can be a QWERTY keyboard, a key pad, or representations of such created on a touch screen.

Cursor control 214 represents a user input device equipped to communicate positional data as well as command selections to processor 202. Cursor control 214 may include a trackball, a stylus, a pen, a touch screen, cursor direction keys or other mechanisms to cause movement of a cursor. In one embodiment, cursor control 214 is a digitizer in which a touch-sensitive, transparent panel covers the screen of display device 210.

The system 150 may optionally include the communication devices 216 and one or more input/output (I/O) devices 218 such as described below.

The communication device 216 may be a network controller that links control unit 250 to a network (not shown) via signal line 220 that may include multiple processing systems. The network of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art. The communication device 216 in other embodiments includes a Bluetooth® transceivers, wireless transceivers, or infrared transceivers for communication along a channel 220.

One or more I/O devices 218 are coupled to the bus 208. These I/O devices 218 are part of system 150 in one embodiment. The I/O device 218 may also include audio input/output device equipped to receive audio input via a microphone and transmit audio output via speakers. Optionally, I/O audio device 218 may contain one or more analog-to-digital or digital-to-analog converters, and/or one or more digital signal processors to facilitate audio processing. In one embodiment, I/O device 418 is a general purpose audio add-in/expansion card designed for use within a general purpose computer system. In yet another embodiment, the input/output device is a camera for the capture of still and video images and sound.

It should be apparent to one skilled in the art that the system 150 may include more or less components than those shown in FIG. 2 without departing from the spirit and scope of the present invention. For example, the system 150 may include additional memory, such as, for example, a first or second level cache, or one or more application specific integrated circuits (ASICs). Similarly, additional components may be coupled to control unit 250 including, for example, an RFID tag reader, digital still or video cameras, or other devices that may or may not be equipped to capture and/or download electronic data to control unit 450. One or more components could also be eliminated.

Figure 3:
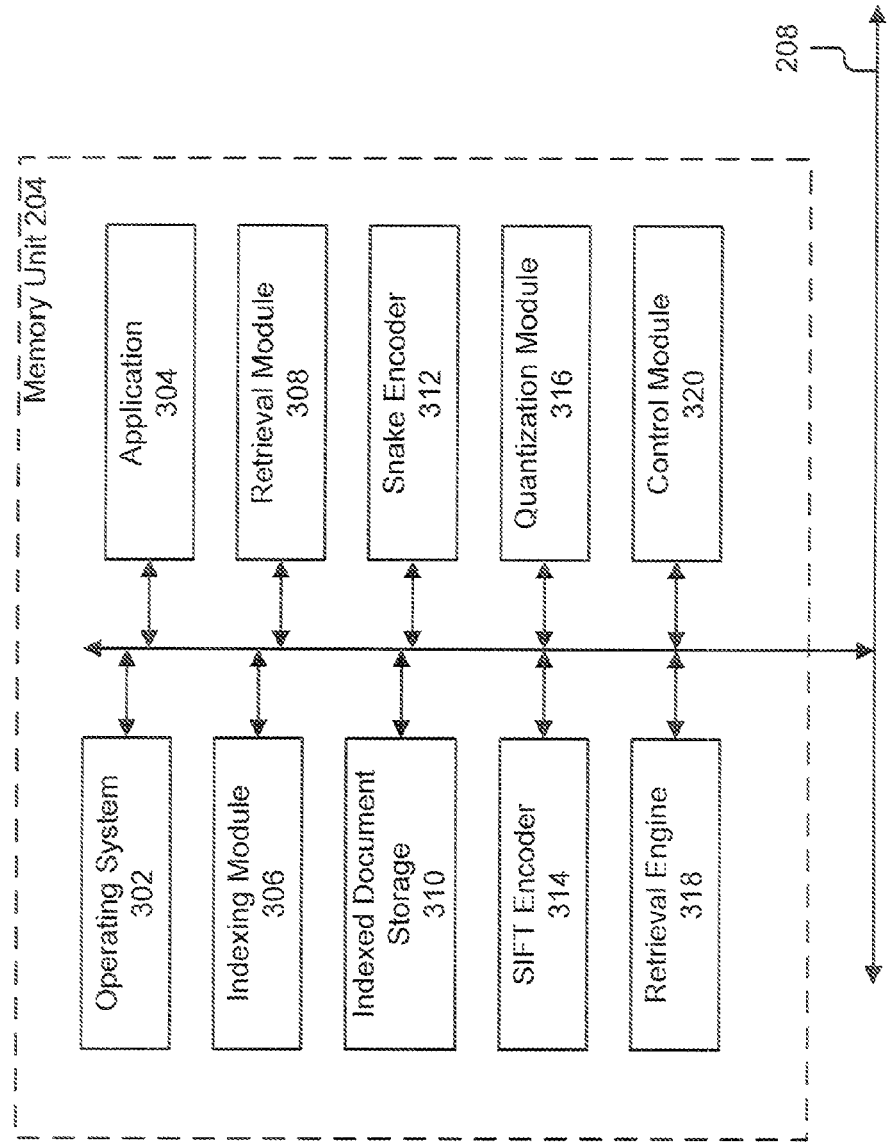
FIG. 3 illustrates a block diagram of one embodiment of the memory of the system of FIG. 2.

FIG. 3 is a block diagram of one embodiment of the memory unit 204 for the system 150. The memory unit 204 preferably comprises: an operating system 302, an application 304, an indexing module 306, a retrieval module 308, an indexed document storage 310, a snake encoder 312, a SIFT encoder 314, a quantization module 316, a retrieval engine and a control module 320. Those skilled in the art will recognize that the memory 204 also includes buffers for temporarily storing data. The memory 204 stores instructions and/or data that may be executed by processor 202. The instructions and/or data comprise code for performing any and/or all of the techniques described herein. These modules 302-320 are coupled by bus 208 to the processor 202 for communication and cooperation. Those skilled in the art will recognized that while the present invention will now be described as modules or portions of a memory 204, the modules or portions thereof may also be stored in other media such as permanent data storage device 406.

The operating system 302 is one of a conventional type such as WINDOWS®, SOLARIS®, BREW®, SYMBIAN®, MAC-OS or a LINUX® based operating system.

The memory 204 may also include one or more application programs 304 including, without limitation, drawing applications, word processing applications, electronic mail applications, financial applications and web browser applications.

The indexing module 306 includes software and routines for indexing an original electronic document or an image in accordance with the present invention. The indexing module 306 begins with an electronic version of a document. This can be the original document, an image of the original document, or alternatively it can be a portion of an image of the original document with a high level of noise. Basically, the indexing module 306 generates synthetic text for an electronic document it receives. The indexing module 306 also associates documents, pages and locations within a page for the synthetic text generated. This allows the synthetic text to be used is as an index back to the original electronic document. In one embodiment, the indexing module 306 receives an electronic document, identifies bounding boxes for text and other content within the electronic document, and converts the bounding boxes to synthetic text. In one embodiment, a synthetic word is created for every bounding box in the image. Various implementations for the indexing module 306 are described in more detail below with reference to FIGS. 4-6. In order to perform indexing, the indexing module 306 is communicatively coupled to the snake encoder 312, the SIFT encoder 314, and the quantization module 316. These components 312, 314 and 316 and their cooperation with the indexing module 306 are described below. It should also be understood that the indexing module 306 is used to create the synthetic text library 160. Once a document has been processed by the indexing module 306, its corresponding synthetic text can be stored in the indexed document storage 310. The corpus of synthetics text representations stored in the indexed storage 310 form a synthetic text library 160.

The retrieval module 308 includes software and routines for retrieving one or more documents corresponding to an input image. The retrieval module 308 works in conjunction with the indexing module 306 to convert an input image into synthetic text. The retrieval module 308 uses the synthetic text string generated by processing the input image with the indexing module 306 to search the indexed document storage 310. The retrieval module 308 is communicatively coupled to cooperate with the retrieval engine 318 and provides the searching functionality. Additionally, the retrieval module 308 retrieves one or more original electronic documents corresponding to portions of matching synthetic text from the synthetics text library 160. In one embodiment, the retrieval module 308 presents an ordered list of the documents most likely to match the input image. The functionality of the retrieval module 308 is described in more detail below with reference to FIGS. 7-9.

The indexed document storage 310 is storage of a conventional type. It may be a combination of both volatile and non volatile storage. The indexed document storage 310 stores original electronic images or documents, corresponding synthetic text and an index between the synthetic text and the original electronic images or documents. For example, in one embodiment the indexed document storage includes: an electronic document in a computer readable form such as an XML file, synthetic text corresponding to the XML file and an index between the XML file and synthetic text. In another embodiment for example, the indexed document storage may include an original application file (E.g., an MS-Word file), an image file representing how the application file would be printed or displayed, synthetic text and one or more indexes between a synthetic text and the application file.

The snake encoder 312 and SIFT encoder 314 are two exemplary encoders that can be used by the present invention to generate the synthetic text. These encoders 312, 314 can be used individually or collectively. Those skilled in the art will recognize that a variety of other types of encoders may be used to generate the synthetic text from the input images. In another embodiment, a spiral encoder is used. A spiral encoder is similar to the snake encoder described below in that it is based on bounding boxes and produces one synthetic word for each bounding box. It uses the same principle of creating a path starting at each word, and then encoding this path. The path is a spiral around the word, connecting the centers of words, and what is encoded are the angles of the segments, and/or the relative lengths of the 2 words joined by the segments, and/or the aspect ratio of bounding boxes, or other similar parameters that will be understood by those skilled in the art. In yet another embodiment, the encoder is a graph encoder. Graph encoders are a family of encoders based on bounding boxes that produces a graph for each bounding box. Although some bounding boxes may not be used in different variations, or a graph is made for each pair of words, or group of three words, or the graph could be non-continuous, or not be a path—e.g. Star shaped and encodes some parameters of this graph as features. Snake encoders and spiral encoders are two embodiments of graph encoders.

Figure 10A:
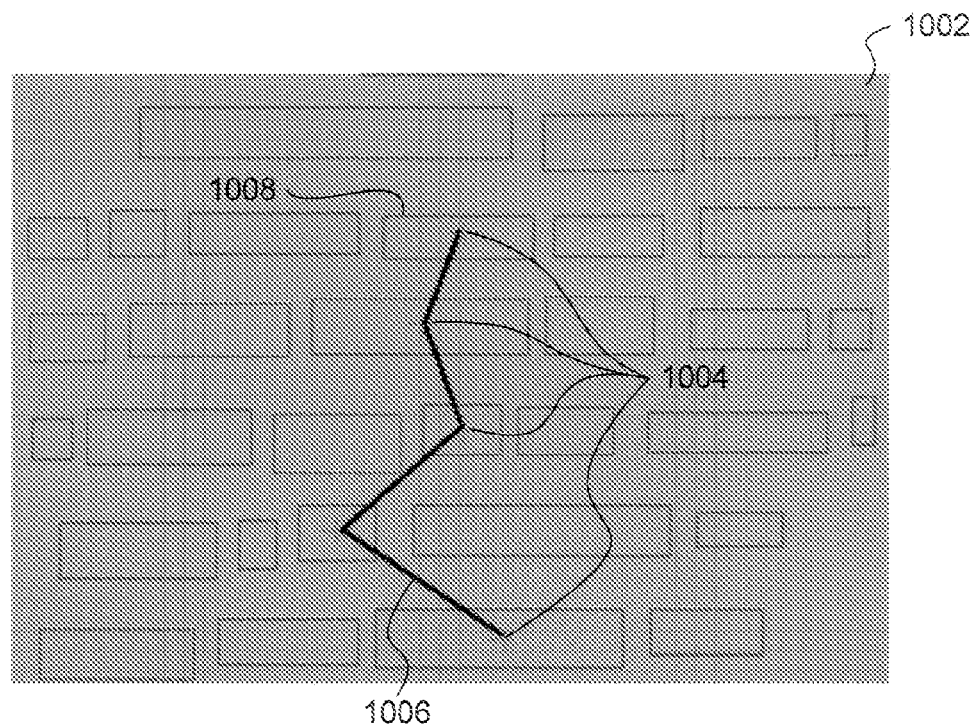
FIGS. 10A-10D are diagrams illustrating the encoding of two-dimensional data into one dimensional data in accordance with one embodiment of the present invention.
Figure 10B:
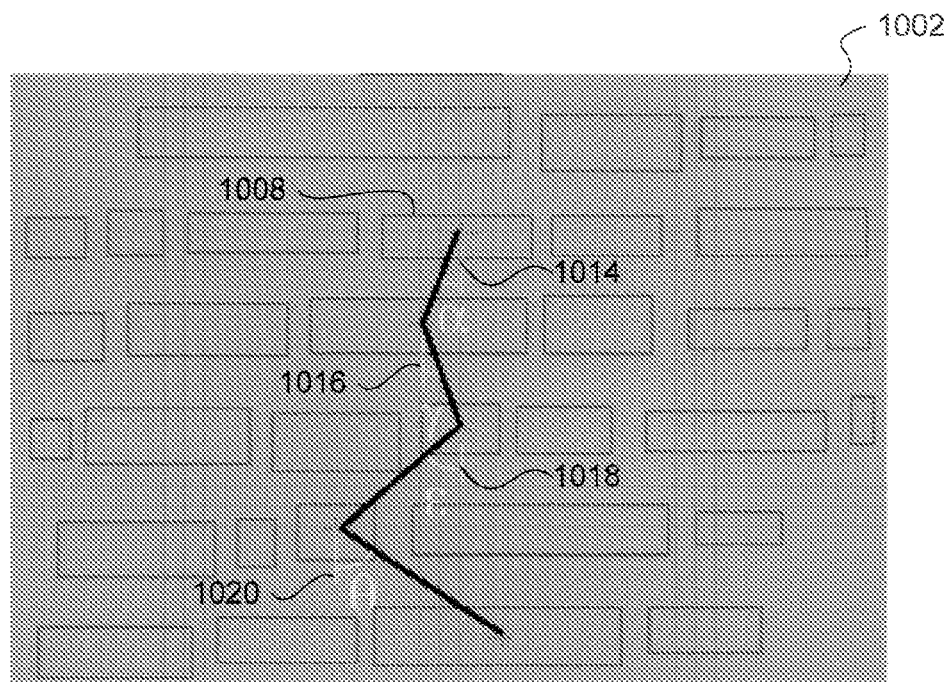
Figure 10C:
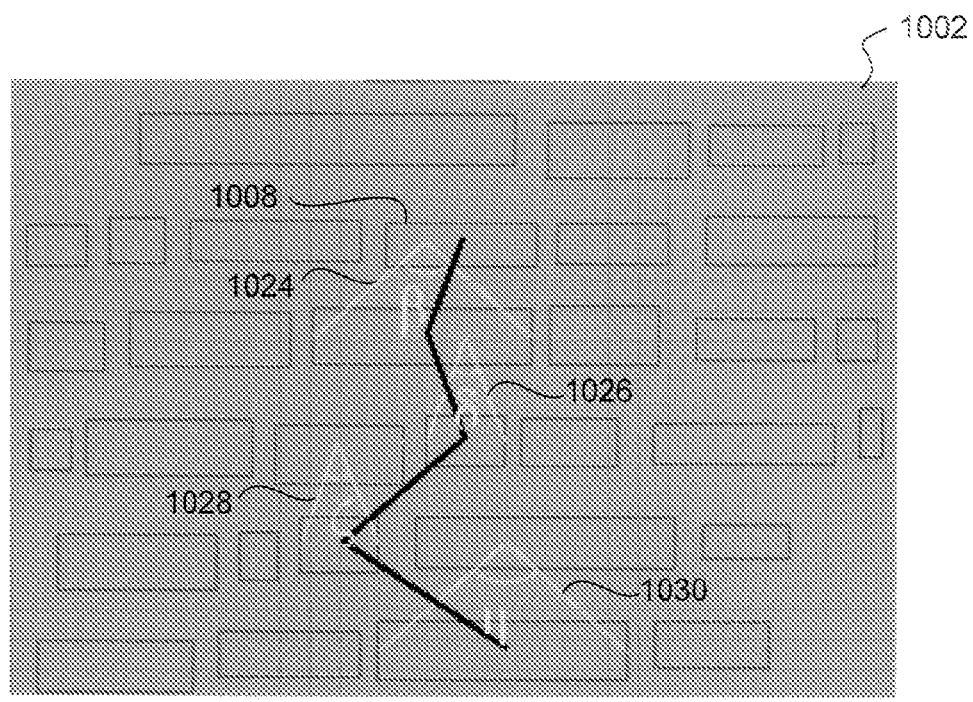
Figure 10D:
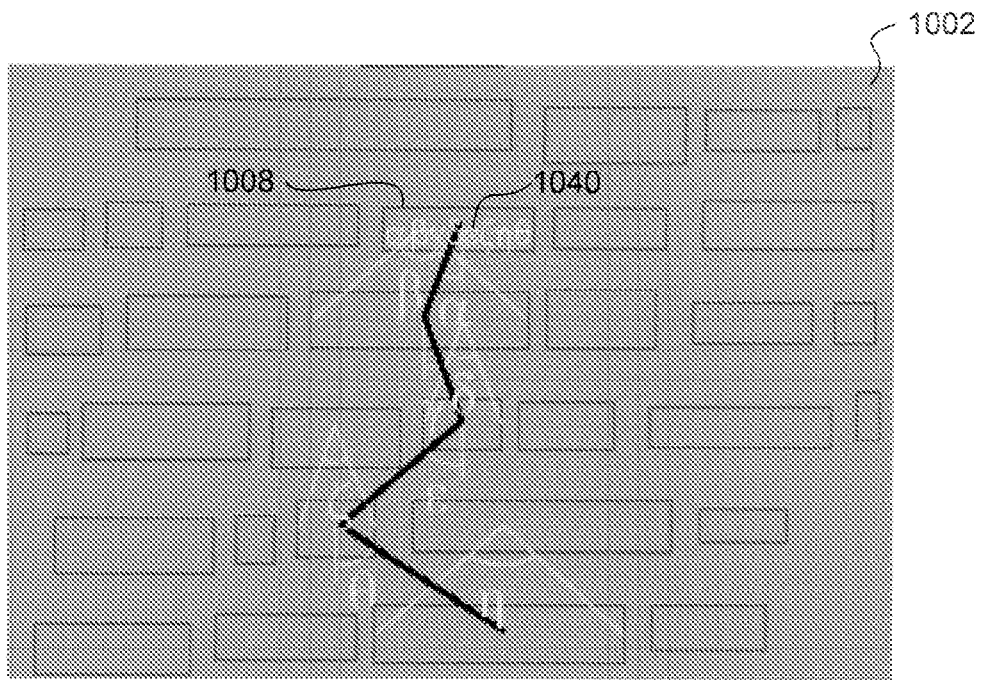

The snake encoder 312 includes software and routines for encoding an image into synthetic text. In particular, the snake encoder 312 is adapted for encoding documents including western character-based languages. In particular, snake coding converts a page of written Western scripts into a sequence of feature vectors. So a sequence of few of these vectors extracted from an image of a patch of text in which bounding boxes of words can be extracted can be used to uniquely identify the original location within a document database. Referring now also to FIGS. 10A-10D, the process performed by the snake encoder 312 will be described in detail. In this embodiment, the layout of bounding boxes of words is converted to features to identify a particular location within a document database (document ID, page number and x, y location on the page). In particular, the geometry of neighboring bounding boxes is encoded into a word of synthetic text. In one embodiment, one word of synthetic text is generated for each bounding box on a page. For a given bounding box 1008, the encoding stores information about the relative location and size of the bounding boxes in a piecewise linear path that starts at the center of the bounding box 1008 and joining the centers of bounding boxes below alternating between left and right. FIG. 10A illustrates a document image 1002 including a plurality of bounding boxes. An example encoding for the given bounding box 1008 that uses the centers 1004 of bounding boxes in a path from the given bounding box to the bottom of the image to generate a snake-like path 1006 is shown. It should be understood that in an alternate embodiment, the encoding could be modified such that the snake pattern was continued only a predefined number of bound boxes below the given bounding box 1008. This unique path is coded as a string. The path for the given bounding box 1008 goes first to the bounding box below and to the left, and then it alternates between right and left. Each element in the feature vector corresponds to an angle that has been quantized. A particular example is shown in FIG. 10A. Each character in the string corresponds to an angle that has been quantized. The odd numbered characters in the string describe the relative location of the bounding boxes in the path. Referring also to FIG. 10B, for the given path 1006, the odd number characters in the string are shown as a quantized an angle to the next bounding box—for example—α 1014, γ 1016, ε 1018, and θ 1020. Referring now also to FIG. 10C, for the given path 1006 the even numbered characters describe the width of those succeeding boxes as a quantized an angle—for example—β 1024, δ 1026, ζ 1028, and η 1030. Thus the synthetic text corresponding to the bounding box 1008 is the string αβγδεζθη 1040 as illustrated in FIG. 10D. The use of this encoding mechanism is particularly advantageous for a number of reasons. First, the use of angles advantageously makes the encoding scale independent. Therefore even though the scale of the input image from a camera differs greatly from the original image, the two images will be recognized as a match by the present invention. Second, the length of the snake can be adapted according to collection size and the level quantization. The length of the snake can be any number of lines from two lines to the remaining number of lines until the bottom of the page is reached. This is particularly advantageous because it allows the present invention to be adapted to the amount of processing power available and/or needed based on the size of the synthetic library 160.

In one embodiment, every page of every document that is wanted in the index undergoes encoding according to the process described above. This means that every bounding box on a page produces a synthetic word. For printed documents, the bounding boxes can be obtained from the printer driver, which is typically more efficient than two dimensional image processing. This is the synthetic text resulting from encoding each page is indexed and stored in the indexed document storage 310.

Figure 11:
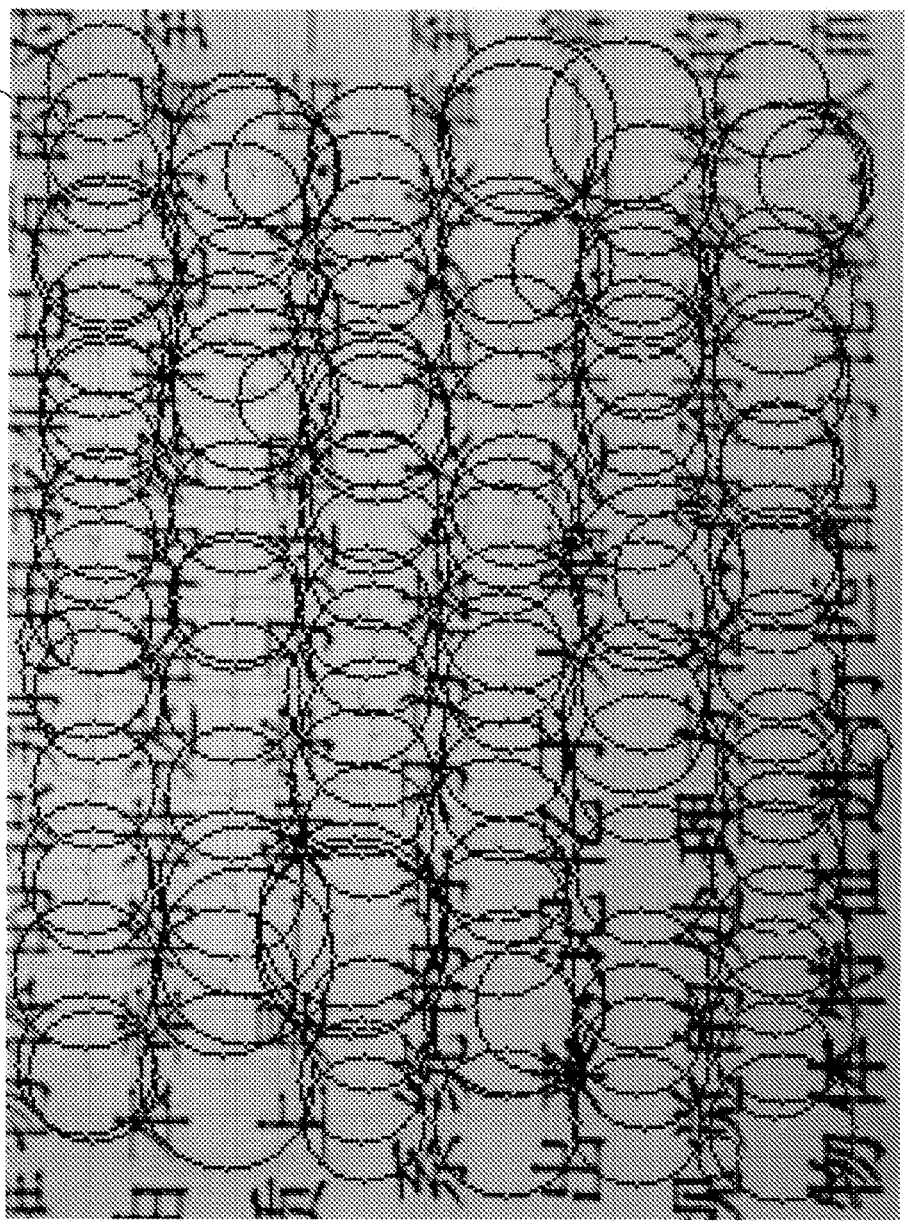
FIG. 11 illustrates a diagram illustrating encoding in accordance with the second embodiment of the present invention.

The SIFT encoder 314 includes software routines for encoding an image into synthetic text. In particular, the SIFT encoder 314 is adapted for encoding documents including eastern ideographic languages. The SIFT encoder 314 performs a function similar to that of the snake encoder 312. The SIFT encoder 314 generates feature vectors based on Scale Invariant Feature Transformation (SIFT) features in a document. In particular, SIFT features align along the lines of text when applied to documents contain Asian scripts of the giving making them suitable for the present invention. Referring now also to FIG. 11, an example of SIFT features for a document having Asian characters is shown. A SIFT feature is produced for each inter-character region. Each SIFT feature is converted to a word in the synthetic language through clustering and quantization. The ordering of SIFT features along lines of text enables the present invention to convert the series of words into paragraphs.

Those skilled in the art will recognize that various other encodings may be used in place of the snake encoder 312 or the SIFT encoder 314. Snake coding has the fundamental property of being able to encode a two-dimensional layout into a one-dimensional text string. The key principle is to encode vertical layout information as a sequence of letters within a word, and horizontal information as a concatenation of words. This is similar to storing a 2D matrix as a vector by storing one column after another. Other encodings are possible with the same property. Also encodings that can encode patches containing images or a mixture of images and text are possible. Snake coding uses a local approach to quantize feature vectors (i.e. the angles in the path) into words. Namely is angle is quantized separately. In alternate embodiments, a mechanism of encoding groups of features or words based on classifier may be used. In this approach a classifier is trained to classify a given path into one of a few thousand categories. Then a word encoding the category would actually be used to store the path. The classifier would be built using unsupervised clustering given many observed paths as training examples. In a more sophisticated instance many paths corresponding to the same layout, obtained through artificial imaging of a patch, are presented to the classifier with the constraint that they should be assigned to the same cluster, with the goal of achieving a classifier more robust to image noise. Similarly the classes for which instances are confused in the validation phase could be given "similar" words, so that when performing text search the two classes would be considered close under some form of edit distance (this already happens naturally in the current implementation of snake coding.)

The quantization module 316 includes software routines for cooperating with the snake encoder 312 or the SIFT encoder 314 to adjust and optimize the encoding. In one embodiment, the quantization of the angles (converting angles to characters) is done by quantizing linearly the tangent of the angle (y=x) to avoid trigonometric computations. For example, one quantization is shown below in Table 1.

TABLE 1

| Angle Range | Text |
| --- | --- |
| 0-10 | A |
| 11-20 | B |
| 21-30 | C |
| 31 or greater | D |

The actual size of the bins can be adjusted. Coarser bins will produce fewer errors when quantizing bounding boxes are obtained from a noisy image, but also less unique patterns. Such a coarser quantization is shown in Table 2 below.

TABLE 2

| Angle Range | Text |
| --- | --- |
| 0-15 | a |
| 15-30 | b |
| 31 or greater | c |

In the Snake encoder, noise affects differently even and odd characters as they encode different geometric properties. Thus in one embodiment a different quantization of odd and even characters is provided. In one embodiment, a sensitivity analysis is performed to produce the quantization as different bins may experience different noise levels due to the geometry of the problem. In yet another embodiment, the present invention can employ quantization at multiple levels. For example, the library of synthetic text may be created such that includes two levels of quantization for each document. The first level quantization is of course, over inclusive level quantization. The second level quantization is that a finer level with the increased accuracy. The retrieval module 308 could then operate by first using the first level quantization to identify a subset of documents in the corpus of documents stored in the indexed document storage 310. Then the second level quantization could be used to retrieve yet a smaller subset of documents from the identified first subset to increase the accuracy and speed at which documents could be recognized.

The retrieval engine 318 is software and routines for comparing a string of synthetic text to a library of synthetic text. One of the particular advantages of the present invention is that it is able to leverage and scale upon existing search engine technology. Thus the retrieval engine 318 may be any more variety of commercial search engines presently available such as from Google, Yahoo, Overture, etc. Any search engine capable of searching for a text string and returning results with a page rank order may be used. The retrieval engine 318 receives a string of synthetic text generated by the indexing module 306 and searches for matching patterns in the synthetic library 160 stored in the indexed document storage 310. The retrieval engine 318, in one embodiment, interacts and is under the control of the retrieval module 308 to perform the image matching of the present invention.

The control module 320 is software routines for controlling the processes of the present invention. In particular, the control module 320 interacts with the other components of the memory unit 204 in accordance with the methods that are described below with reference to FIGS. 4-9. While the control module 320 is shown here as a separate module controlling the other modules of the memory 204, those skilled in the art will recognize that this control functionality may be distributed amongst the other modules of the memory 204 and the control module 220 may be omitted.

Methods

Figure 4:
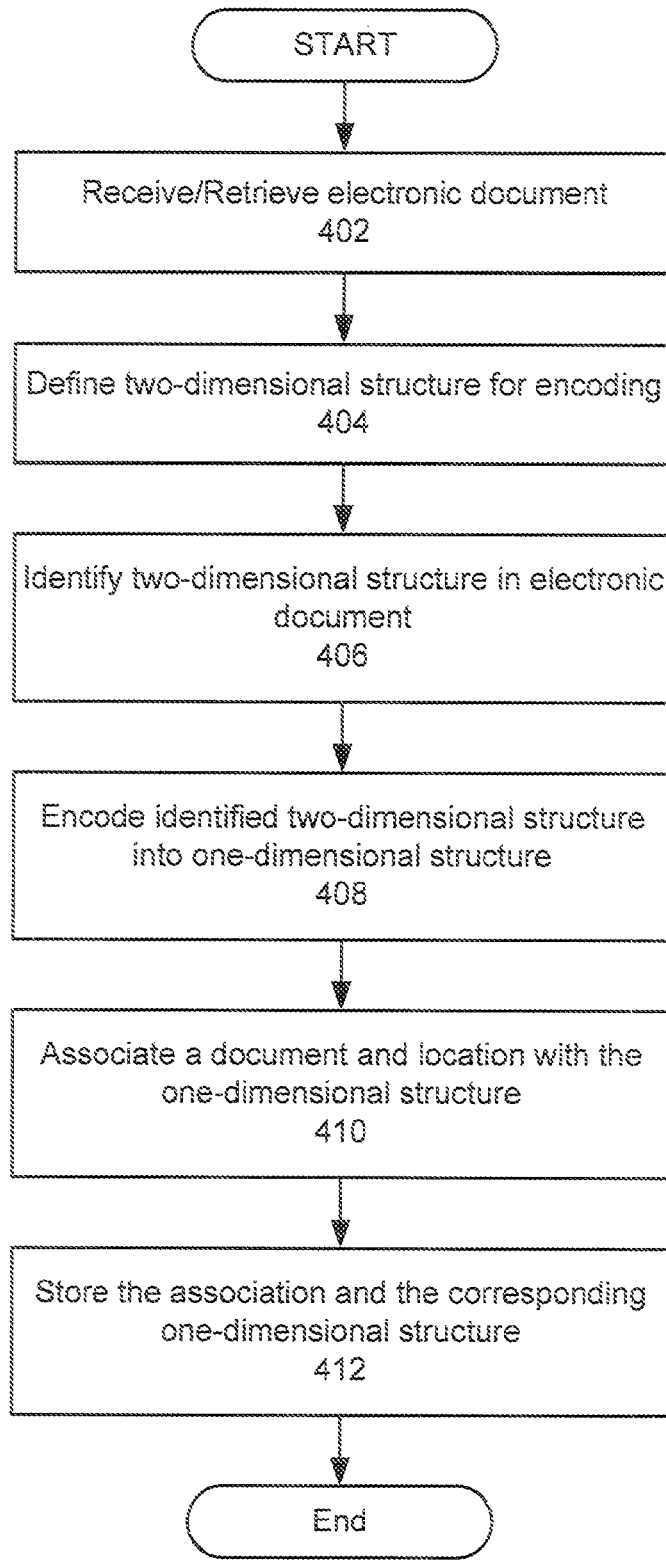
FIG. 4 illustrates a flow chart of one embodiment of the method for indexing documents in accordance with the present invention.

FIG. 4 illustrates a flow chart of one embodiment of the method for indexing documents in accordance with the present invention. The method begins by receiving or retrieving 402 an electronic document. Then, the method then defines 404 a two-dimensional structure for encoding. In one embodiment, the two-dimensional structure is a bounding box as has been described above with reference to FIG. 10. In an alternate embodiment, the two-dimensional structure is a SIFT feature as has been described above with rooms to FIG. 11. Next the method identifies 406 two-dimensional structures in the electronic document received in step 402. Then the method encodes 408 the identified two-dimensional structures into a one-dimensional structure. This encoding can use any one of the encoding methods that have been described above. Then a document and location are associated 410 with the one-dimensional structure. Finally, the method stores 412 the association and the corresponding one-dimensional structure, for example in a database. This process is repeated for a plurality of two-dimensional structures in the electronic document, for example there maybe numerous association/one-dimensional structure pairs for a page of a given document. Moreover, any number of documents can be used to build a library 160 of synthetic text that later be used in retrieval to locate the corresponding electronic documents.

Figure 5:
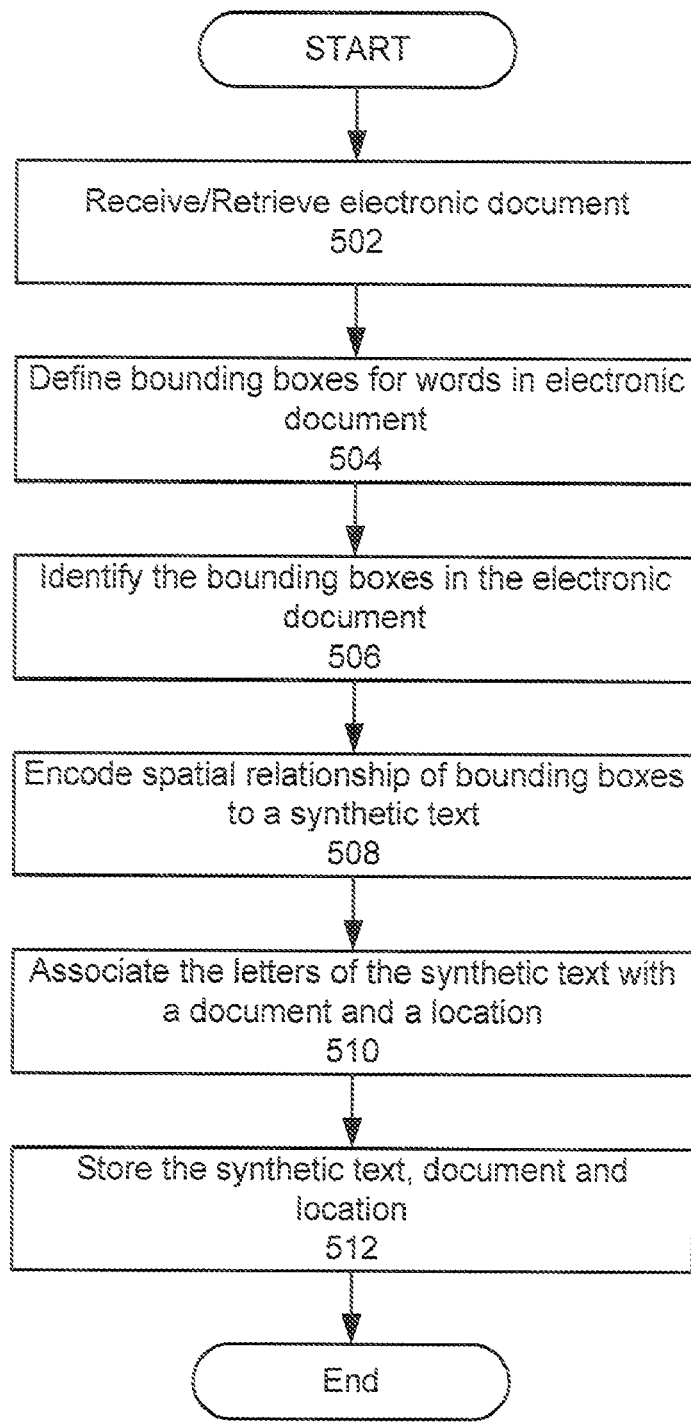
FIG. 5 illustrates a flow chart of a second embodiment of the method for indexing documents in accordance with the present invention.

Referring now to FIG. 5 illustrates a second embodiment of the method for indexing documents in accordance with the present invention will be described. The method begins by receiving or retrieving 502 an electronic document. Next, the method defines a two-dimensional structure for encoding by defining 504 bounding boxes around words within the electronic document. Each of the bounding boxes within the electronic document is next identified 506. Then, the spatial relationships between the bounding boxes identified in the electronic document are encoded 508 to synthetic text. In particular, a graph encoder (such as the snake encoder 312) is used to generate a text string for each bounding box within the electronic document. The letters of the synthetic text (e.g., a text string) generated in the encoding step 508 are then associated with a document and a location within the document from which they were generated. For example, document ID, the page and the x, y location of the bounding box within the electronic document are associated with the text string. Finally, this association is stored 512. For example, the synthetic text, document name and location in the document may be stored together in a lucene index.

Figure 6:
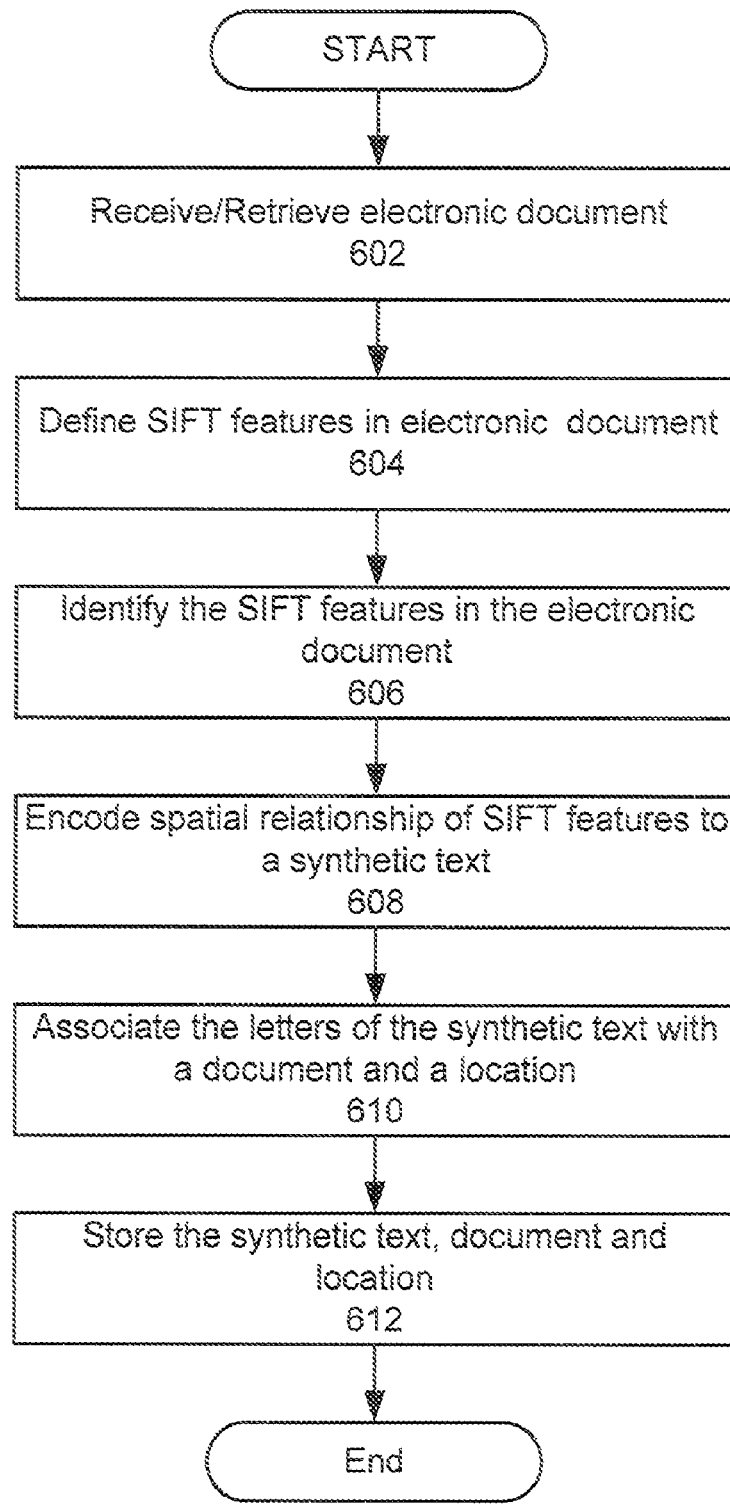
FIG. 6 illustrates a flow chart of a third embodiment of the method for indexing documents in accordance with the present invention.

FIG. 6 illustrates a third embodiment of the method for indexing documents in accordance with the present invention. This third embodiment is designed for use with documents having Asian languages or ideographic characters. The third embodiment of the method for indexing documents begins by receiving/retrieving 602 an electronic document. In this method, SIFT features are defined 604 for each character/word/intercharacter space in the electronic document. Next, the SIFT features in the electronic document are identified 606. Then the spatial relationships of the SIFT features are encoded 608 into the synthetic text. For example, the SIFT encoder 314 can be used to generate text strings from the SIFT features in a document image. Next, the synthetic text is then associated 610 with a document, page, and location on the page corresponding to the SIFT feature from which the text string was generated. This information is then stored 612 in the database.

Figure 7:
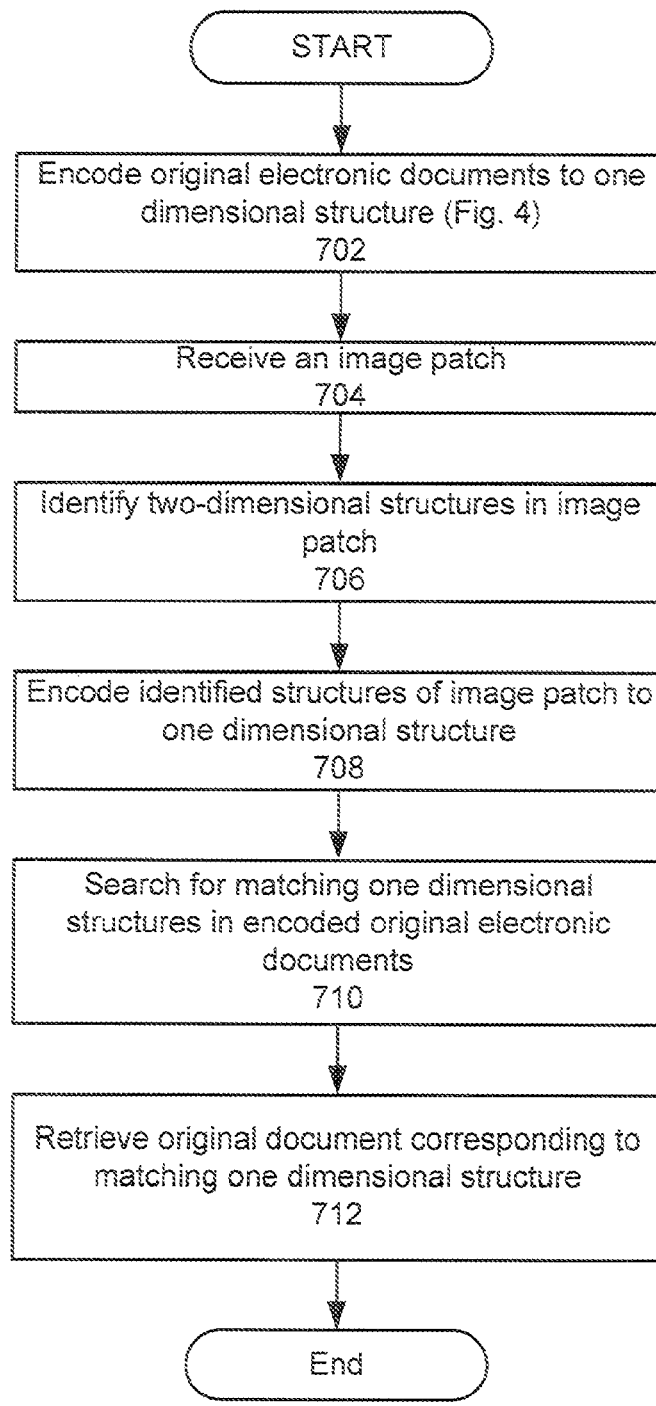
FIG. 7 illustrates a flow chart of an embodiment of the method for retrieving documents in accordance with the present invention.

Referring now to FIG. 7, an embodiment of the method for retrieving documents in accordance with the present invention will be described. The method begins by encoding 702 at least one original document to a one-dimensional structure as has been described above with reference to FIG. 4. Alternatively, the method may assume that there already exists a library of synthetic text that has been created over time and is accessible for comparison. Then the method receives 704 an image patch. For example, an image patch 152 such as shown in FIG. 1B is received. Then the method identifies 706 one or more two-dimensional structures 1008 in the image patch 152. Those skilled in the art will recognize that such two-dimensional structures may take a variety of different formats such as bounding boxes or a variety of other different shaped polygons reflecting either areas of image data or areas of white space. Then the method encodes 708 the two-dimensional structure(s) of the image patch 152 identified in step 706 into a one-dimensional structure. Using the encoded one-dimensional structure, the method then searches 710 for any matching one-dimensional structures in the encoded original electronic documents. Those skilled in the art will recognize that a variety of conventional search engines may be used to compare one-dimensional structures such as text. The present invention is particularly advantageous because text searches are used. Text searches are advantageous because they may be quickly performed on a large corpus of documents. Furthermore, the text search can leverage existing search technologies and perform a prefix search, provide matching scores, and rank the matches according to a variety of different parameters. The present invention is particularly advantageous because it can use any variety of existing search engines for searching. As with conventional search engines, this searching step may yield a plurality of matching results ordered on a variety of different parameters. Once a matching one-dimensional structure from the encoded original electronic documents has been identified, the method retrieves 712 the original document corresponding to the matching one dimensional structure. This retrieval step can include retrieving the particular page and location corresponding to the match and presenting it to the user. One of the particular advantages of the present invention is that unlike other matching technologies, the combination of the use of synthetic text, utilizing existing search technology, and allowing the quantization to be adjusted results in document retrieval with greater accuracy and fewer false positive results.

Figure 8:
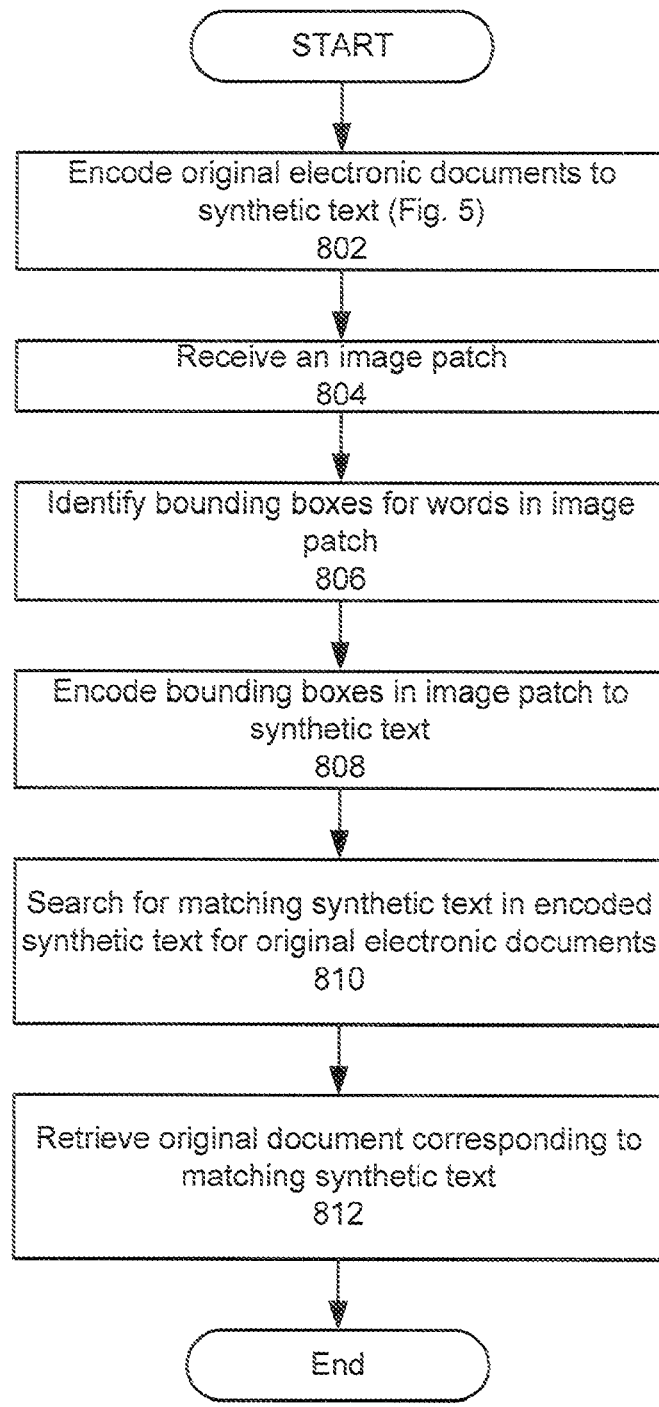
FIG. 8 illustrates a flow chart of a second embodiment of the method for retrieving documents in accordance with the present invention.

Referring now to FIG. 8, a second embodiment of the method for retrieving documents in accordance with the present invention will be described. The method begins by encoding 802 a plurality of electronic documents to synthetics text as has been described above with reference to FIG. 4. This step is performed repeatedly overtime to create a library of synthetic text that may be searched to find matching electronic documents. Next the method receives 804 an image patch 152. Then the method identifies 806 one or more bounding boxes 1008 for words within the image patch 152. Next, the method encodes 808 the bounding boxes 1008 in the image patch 152 to synthetic text. In the present invention, the encoding is preferably done by individually selecting each bounding box and then performing snake encoding for that bounding box to the bottom edge of the image patch. The end result is that each bounding box in the image patch will be converted to a string of synthetic text. The results of the encoding described above in step 808 can then be used to search within the previously encoded original electronic documents. Since the original documents have been encoded in this synthetic text and a patch is also encoded in the synthetic text, this searching becomes a simple task of comparison. For increased accuracy the text comparison can be augmented as will be understood by those skilled in the art and as is done for conventional Internet search engines. Furthermore, to improve recognition, the synthetic text for the input image could be modified, such as not generating synthetic text for any bounding box on the edge of the patch, thereby avoiding any of the edge effect of caused by the size of the patch. Once a match has been found in the searching step 810, the method retrieves at least one original document corresponding to the matching synthetic text. As has been noted above, all the matches to the synthetic patch can be presented to the user in rank order in a manner similar to how web pages are represented.

Figure 9:
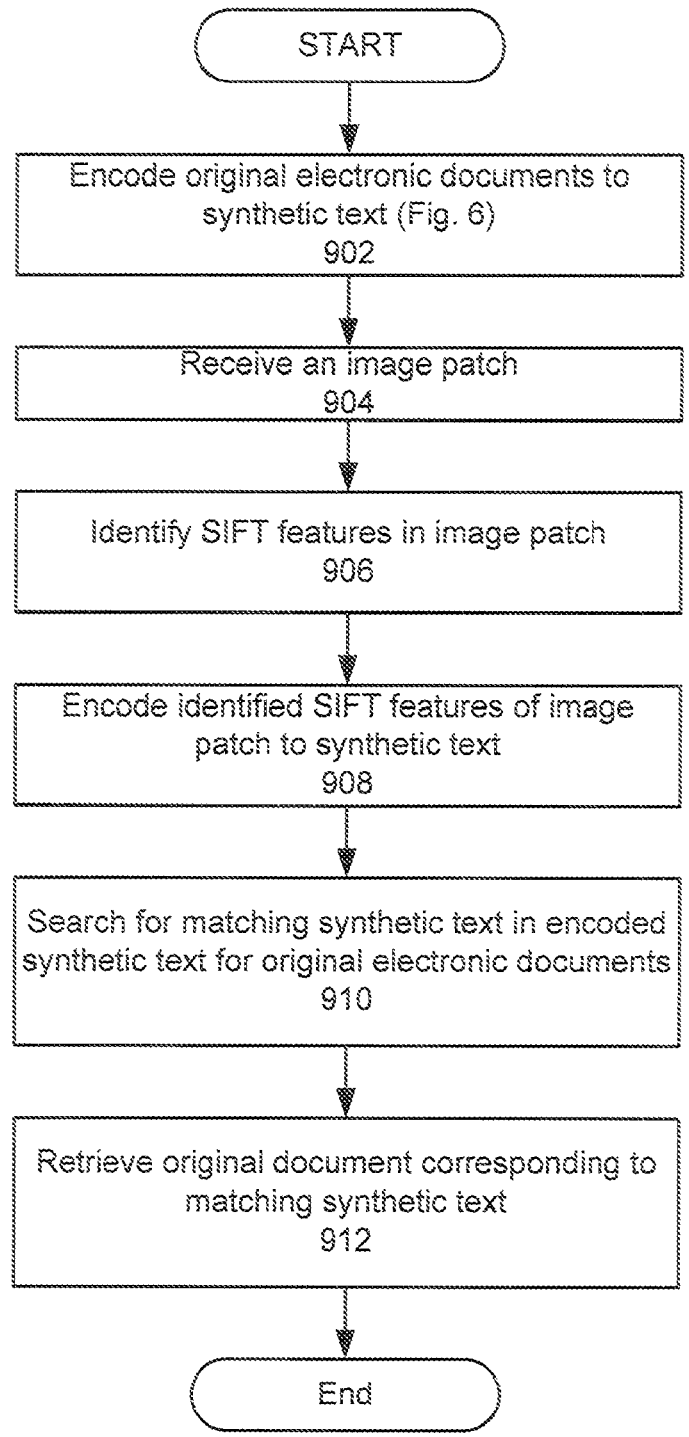
FIG. 9 illustrates a flow chart of a third embodiment of the method for retrieving documents in accordance with the present invention.

Referring now to FIG. 9, a third embodiment of the method for retrieving documents in accordance with the present invention will be described. The method shown in FIG. 9 is similar to the methods described above with reference to FIGS. 7 and 8, however, it is directed towards retrieving documents where the input image patch includes SIFT features. The method has steps almost identical to those described above with reference to FIG. 8. It should be noted, however, that the step of identifying features 906 in the image patch identifies SIFT features. Similarly, the step of encoding 908 utilizes the SIFT encoder 314 to convert the SIFT features to a string of synthetic text. Otherwise, the method of FIG. 9 is similar to the methods that have been described above and has all the same advantages while operating on documents containing Asian idea graphic languages.

Figure 12A:
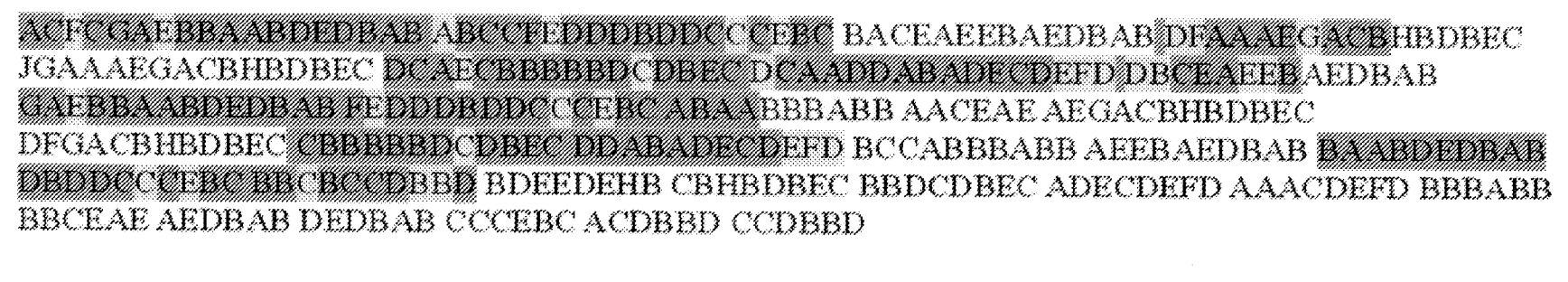
Figure 12B:
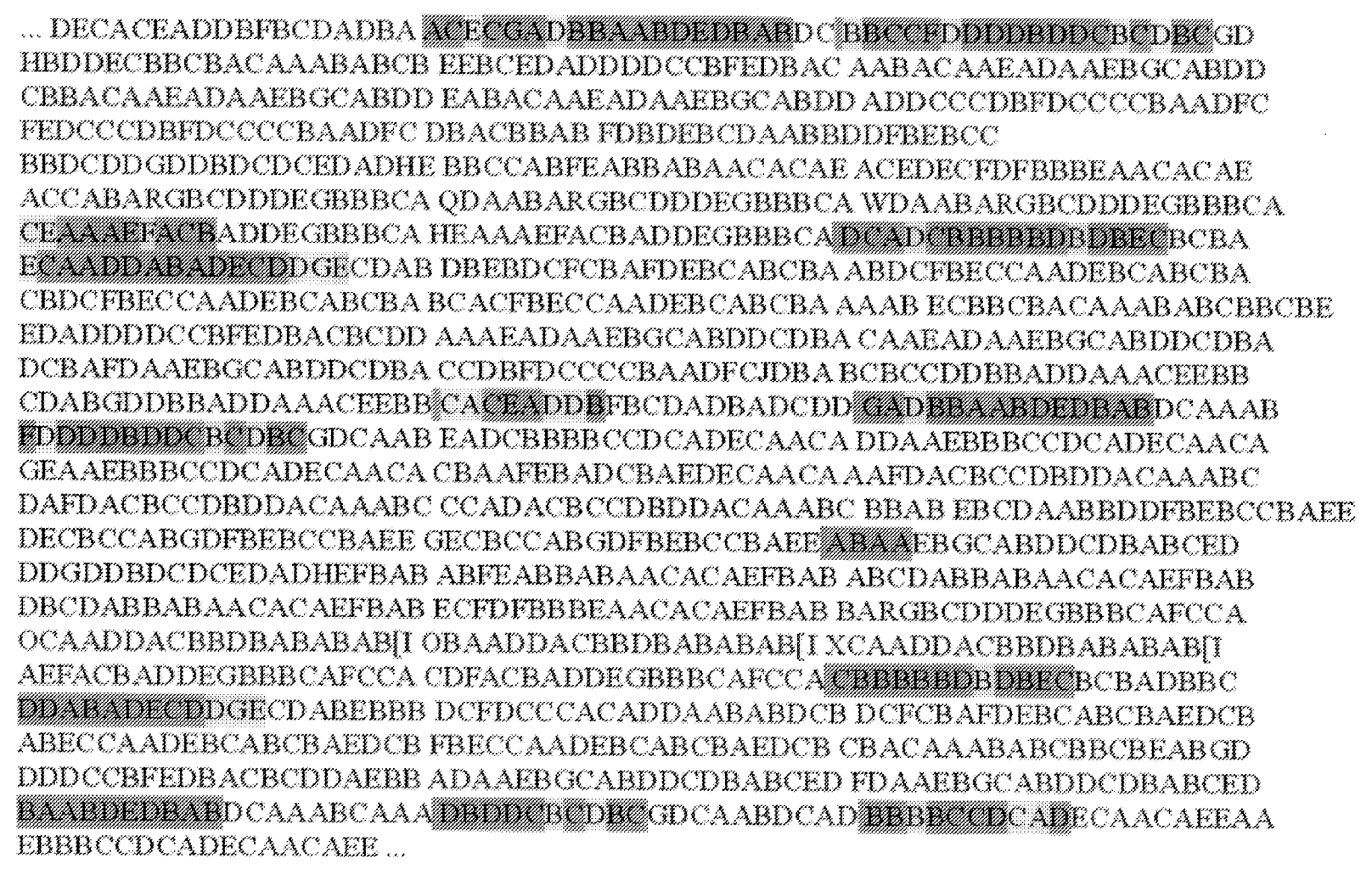

FIGS. 12A and 12B illustrate the results of encoding and image patch and a base document with the overlapping matching synthetics text shown with highlighting. FIG. 12A illustrates an example of synthetic text resulting from the processing of an image patch. FIG. 12B illustrates a library of synthetic text corresponding to hit the rally of electronic documents. The areas in FIGS. 12A and 12B illustrate corresponding matches between the input synthetic text and a library of documents. These instances of matching strings can then be rank ordered according to likelihood of an exact match. Additionally the corresponding original documents that generated the portion of the library of synthetic text can also be retrieved and presented to the user in conjunction with the rank ordering of the matches.

Those skilled in the art will recognize that the present invention can be enhanced by employing different search strategies. The description above has assumed the use of a conventional search engine and input of the synthetic text generated from processing the input image patch. However, when an image is taken, a paragraph is produced in a new lexicon. This paragraph constitutes the query by which the original document is retrieved. However when presented to the text search engine, it may be advantageous to add words to the query incrementally using previous results to refine the query. For example, alternate spellings (e.g. due to likely quantization errors when a value is in the proximity of a quantization boundary) can be created and input to the search engine. Such alternate search strategies can be optimized by considering 1) the need for prefix search, as the lines visible in a patch may not reach far down enough in the page to produce the complete word; 2) the redundancy in the encoding. For example typically when using a snake encoder, the top two lines in the patch contain most of the information and thus it may be sufficient to submit them as query; and 3) the possibility that noise may alter some letters of the encoding in a predictable way, for example because the value was close to the quantization boundary.

A specific modification to the above embodiment is to employ spelling variations in. For example, likely spelling variations for every term in a spiral coding query can be used to increase accuracy. This approach considers the distance of the floating point features encoded in each term to the quantization boundary that determines the letter that the given feature will be encoded as. Features that are closer to the quantization boundaries are more likely to be changed by noisy imaging. Using this new approach fewer alternative spellings are generated, thus decreasing the number and score of false positives. This improvement can be used to increasing the speed of recognition (because fewer spelling variations are tested), and/or to increase scalability maintaining the number of spelling variations per term approximately constant (query time and recognition rate will also stay approximately constant.) This can be achieved increasing the number of bits per encoded feature, which will increase the misspelling rate, but also the uniqueness of each term.

The foregoing description of the embodiments of the present invention has been presented for the purposes of illustration and description. It is not intended to be exhaustive or to limit the present invention to the precise form disclosed. Many modifications and variations are possible in light of the above teaching. For example, the systems and methods of the present invention may be used for other applications such as but not limited to comparing music, comparing fingerprint signatures, or comparing images of faces. In all these other applications, the original input is converted to text compared to a library of synthetic text. Specifically, a very small clip of music may be converted to synthetic text where notes are converted to characters inappropriately grouped into words and then compared to a library of music that has been converted to synthetic text to determine a match. Similarly, fingerprint matching can be ordered and thus the method can be applied using a procedure analogous to that described above for Asian characters. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Accordingly, the disclosure of the present invention is intended to be illustrative, but not limiting, of the scope of the present invention, which is set forth in the following claims.

The invention claimed is:

1. A computer system for generating synthetic words for parts of documents, the computer system comprising:
    an indexing module for receiving an electronic document comprising a first part and a second part, identifying a first bounding box for the first part, identifying a second bounding box for the second part, generating a synthetic word of the first bounding box, the synthetic word including a location of the first bounding box, a first quantized angle measured between a line originating from the first bounding box and a path joining a center of the first bounding box to a center of the second bounding box and a second quantized angle defining a width of the second bounding box, and producing an association between the electronic document and the synthetic word; and
    a data storage for storing the electronic document, the synthetic word and the association between the electronic document and the synthetic word,
    wherein the first part and the second part are at least one of text, a character and an image.

2. The computer system of claim 1 wherein the synthetic word includes at least one of text and scripts.

3. The computer system of claim 1 wherein the indexing module provides a full true mapping of the electronic document to plain text.

4. The computer system of claim 1 wherein the synthetic word alone is sufficient to perform retrieval of a corresponding electronic document.

5. The computer system of claim 1 wherein the synthetic word does not represent any natural language content of the electronic document.

6. The computer system of claim 1 wherein the synthetic word is in a one dimensional synthetic language encoded from a two-dimensional structure of a part of the electronic document.

7. The computer system of claim 1 wherein the indexing module also associates a document identification, a document page and a location within the document page to the synthetic word.

8. The computer system of claim 1 further comprising a retrieval module for retrieving one or more original electronic documents corresponding to a string of synthetic text, the retrieval module adapted for communication with the data storage and the indexing module.

9. The computer system of claim 1, comprising a graph encoder for converting the electronic document to synthetic text by converting a script in the electronic document to a sequence of quantized feature vectors.

10. The computer system of claim 1, further comprising a quantization module to adjust and optimize the generation of the synthetic word by modifying a quantization parameter used in the generation.

11. The computer system of claim 1 wherein the first part and the second part are each a word of synthetic text.

12. The computer system of claim 8 wherein the retrieval module receives an image patch and generates a string of synthetic text from the image patch.

13. The computer system of claim 8 further comprising a retrieval engine for searching for the string of synthetic text in the data storage, the retrieval engine being a conventional search engine.

14. The computer system of claim 8, wherein the retrieval module retrieves and presents an ordered list of electronic documents most likely to match the input image.

15. A method for generating synthetic words for parts of documents, the method comprising:
using a computer to perform steps comprising:
receiving an electronic document comprising a first part and a second part;
identifying a first bounding box for the first part;
identifying a second bounding box for the second part;
generating a synthetic word of the first bounding box, the synthetic word including a location of the first bounding box, a first quantized angle measured between a line originating from the first bounding box and a path joining a center of the first bounding box to a center of the second bounding box and a second quantized angle defining a width of the second bounding box; and
producing an association between the electronic document and the synthetic word, wherein the first part and the second part are at least one of text, a character and an image.

16. The method of claim 15, comprising storing the electronic document and an association between the synthetic word and the electronic document in a database.

17. The method of claim 15, wherein the steps of generating the synthetic word and producing the association are performed for every bounding box in the electronic document.

18. The method of claim 15, comprising receiving a second electronic document and performing the steps of generating a second synthetic word and producing a second association for the second electronic document.

19. The method of claim 16, wherein the association includes a document identification, a document page and a location within the document page.

* * * * *